US010219266B2

(12) United States Patent
Suzuki et al.

(10) Patent No.: US 10,219,266 B2
(45) Date of Patent: Feb. 26, 2019

(54) TERMINAL DEVICE, BASE STATION DEVICE, INTEGRATED CIRCUIT, AND COMMUNICATION METHOD

(71) Applicant: Sharp Kabushiki Kaisha, Sakai, Osaka (JP)

(72) Inventors: Shoichi Suzuki, Sakai (JP); Tatsushi Aiba, Sakai (JP); Kazunari Yokomakura, Sakai (JP); Hiroki Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/568,783

(22) PCT Filed: Apr. 6, 2016

(86) PCT No.: PCT/JP2016/061247
§ 371 (c)(1),
(2) Date: Oct. 23, 2017

(87) PCT Pub. No.: WO2016/170983
PCT Pub. Date: Oct. 27, 2016

(65) Prior Publication Data
US 2018/0092069 A1    Mar. 29, 2018

(30) Foreign Application Priority Data
Apr. 24, 2015    (JP) .................... 2015-089377

(51) Int. Cl.
*H04L 1/18* (2006.01)
*H04W 72/04* (2009.01)
(Continued)

(52) U.S. Cl.
CPC ............. *H04W 72/042* (2013.01); *H04L 1/18* (2013.01); *H04L 1/1812* (2013.01);
(Continued)

(58) Field of Classification Search
CPC ....... H04L 1/18; H04L 1/1812; H04L 1/1861; H04L 1/1864
See application file for complete search history.

(56) References Cited

U.S. PATENT DOCUMENTS

| 2014/0328260 | A1  | 11/2014 | Papasakellariou et al. |
| 2017/0048040 | A1* | 2/2017  | Zhang ............... H04B 7/2621 |
| 2017/0215172 | A1* | 7/2017  | Yang ..................... H04B 7/26 |

FOREIGN PATENT DOCUMENTS

EP    2538734 A1    12/2012

OTHER PUBLICATIONS

3rd Generation Partnership Project Technical Specification 3GPP TS 36.300 v12.4.0 (Dec. 2014) "Evolved Universal Terrestrial Radio Access (EUTRA) and Evolved Universal Terrestrial Radio Access Network (E-UTRAN)"; Overall description; Stage 2 (Release 12).

(Continued)

*Primary Examiner* — Scott M Sciacca
(74) *Attorney, Agent, or Firm* — ScienBiziP, P.C.

(57) ABSTRACT

A terminal device receives a control channel including a DCI format and transmits a PUSCH, in which the DCI format includes an uplink index and information for indicating a HARQ process number; when both a first bit and a second bit of the uplink index are set to 1, the HARQ process number in the PUSCH corresponding to the first bit is X and the HARQ process number in the PUSCH corresponding to the second bit is mod (X+1, Z); the mod (X+1, Z) is a function outputting a remainder when dividing (X+1) by Z; the X is determined based on the information for indicating the HARQ process number; and the Z is a value identical to a maximum number of HARQ processes in a serving cell determined by an uplink/downlink configuration.

10 Claims, 16 Drawing Sheets

(51) Int. Cl.
*H04L 29/08* (2006.01)
*H04W 72/14* (2009.01)

(52) U.S. Cl.
CPC .......... *H04L 1/1861* (2013.01); *H04L 1/1864* (2013.01); *H04L 29/08* (2013.01); *H04W 72/04* (2013.01); *H04W 72/14* (2013.01)

(56) References Cited

OTHER PUBLICATIONS

Source: NVIDIA; Title: "UL HARQ considerations for LTE LAA", R2-151551, NVIDIA, 3GPP TSG RAN WG2 Meeting #89bis, Bratislava, Slovakia, Apr. 20-24, 2015.

* cited by examiner

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 5

| UL-DL CONFIGURATION | NUMBER OF HARQ PROCESSES | NUMBER OF BITS OF INFORMATION INDICATING HARQ PROCESS NUMBER |
|---|---|---|
| 0 | 7 | 3 |
| 1 | 4 | 2 |
| 2 | 2 | 1 |
| 3 | 3 | 2 |
| 4 | 2 | 1 |
| 5 | 1 | 0 |
| 6 | 6 | 3 |

FIG. 8

| TDD or FDD | SYNCHRONOUS HARQ or ASYNCHRONOUS HARQ | UL-DL CONFIGURATION | NUMBER OF HARQ PROCESSES | NUMBER OF BITS OF INFORMATION INDICATING HARQ PROCESS NUMBER |
|---|---|---|---|---|
| TDD | SYNCHRONOUS HARQ | 0 | 7 | 0 |
| | | 1 | 4 | 0 |
| | | 2 | 2 | 0 |
| | | 3 | 3 | 0 |
| | | 4 | 2 | 0 |
| | | 5 | 1 | 0 |
| | | 6 | 6 | 0 |
| | ASYNCHRONOUS HARQ | 0,1,2,3,4,5,6 | 8 | 3 |

FIG. 9

(a) extended MAC RAR in case that F field is set to 0

(b) extended MAC RAR in case that F field is set to 1

TERMINAL DEVICE, BASE STATION DEVICE, INTEGRATED CIRCUIT, AND COMMUNICATION METHOD

TECHNICAL FIELD

The present invention relates to a terminal device, a base station device, an integrated circuit, and a communication method.

This application claims priority based on JP 2015-089377 filed on Apr. 24, 2015, the contents of which are incorporated herein by reference.

BACKGROUND ART

A In the 3rd Generation Partnership Project (3GPP), a radio access method and a radio network for the cellular mobile communication (hereinafter referred to as "Long Term Evolution (LTE)", "Evolved Universal Terrestrial Radio Access (EUTRA)", or "Evolved Universal Terrestrial Radio Access Network (EUTRAN)") have been studied. In LTE, a base station device is also referred to as an evolved NodeB (eNodeB), and a terminal device is also referred to as user equipment (UE). LTE is a cellular communication system in which multiple areas each covered by the base station device arc deployed to form a cellular structure. A single base station device may manage multiple cells.

LTE supports a time division duplex (TDD). LTE that employs the TDD scheme is also referred to as TD-LTE or LTE TDD. In TDD, uplink signals and downlink signals are time division multiplexed. Furthermore, supports a frequency division duplex (FDD).

LTE provides a Hybrid Automatic Repeat reQuest (HARQ) functionality at Medium Access Control (MAC) layers. The HARQ functionality in the downlink has an asynchronous adaptive HARQ characteristic, and the HARQ functionality in the uplink has a synchronous HARQ characteristic (NPL 1). Introduction of the asynchronous HARQ in the uplink has been studied in the 3GPP (NPL 2).

CITATION LIST

Non-Patent Document

[NON-PATENT DOCUMENT 1] "3GPP TS 36.300 v12.4.0 Evolved Universal Terrestrial Radio Access (E-UTRA) and Evolved Universal Terrestrial Radio Access Network (E-UTRAN); Overall description; Stage 2", 7 Nov. 2015.
[NON-PATENT DOCUMENT 2] "UL HARQ considerations for LTE LAA", R2-151551, NVIDIA, 3GPP TSG RAN WG2 Meeting #89bis, 20-24 Apr. 2015.

DISCLOSURE OF THE INVENTION

Problems to be Solved by the Invention

However, a concrete method for introducing an asynchronous HARQ in the uplink has not been fully studied. For instance, a method for switching between a synchronous HARQ and the asynchronous HARQ in the uplink has not been fully studied. Further, for instance, a method for identifying a HARQ process related to an uplink grant has not been fully studied. Moreover, for instance, a method for processing a HARQ buffer has not been fully studied.

The present invention provides a terminal device capable of efficiently communicating with a base station device, an integrated circuit mounted on the terminal device, a communication method used by the terminal device, the base station device communicating with the terminal device, an integrated circuit mounted on the base station device, and a communication method used by the base station device.

Means for Solving the Problems (1) The aspects of the present invention are contrived to provide the following means. A first aspect of the present invention is a terminal device which includes a reception unit configured to receive a control channel including a downlink control information (DCI) format and a transmission unit configured to transmit a physical uplink shared channel (PUSCH). The DCI format includes an uplink index and information for indicating a hybrid automatic repeat request (HARQ) process number; when both a first bit and a second bit of the uplink index are set to 1, the HARQ process number in the PUSCH corresponding to the first bit is X and the HARQ process number in the PUSCH corresponding to the second bit is mod (X+1, Z); the mod (X+1, Z) is a function outputting a remainder when dividing (X+1) by Z; the X is determined based on the information for indicating the HARQ process number; and the Z is a value identical to a maximum number of HARQ processes in a serving cell determined by an uplink/downlink configuration.

(2) A second aspect of the present invention is a base station device which includes a transmission unit configured to transmit a control channel including a downlink control information (DCI) format and a reception unit configured to receive a physical uplink shared channel (PUSCH). The DCI format includes an uplink index and information for indicating a hybrid automatic repeat request (HARQ) process number; when both a first bit and a second bit of the uplink index are set to 1, the HARQ process number in the PUSCH corresponding to the first bit is X and the HARQ process number in the PUSCH corresponding to the second bit is mod (X+1, Z); the mod (X+1, Z) is a function outputting a remainder when dividing (X+1) by Z; the X is determined based on the information for indicating the HARQ process number; and the Z is a value identical to a maximum number of HARQ processes in a serving cell determined by an uplink/downlink configuration.

(3) A third aspect of the present invention is a communication method for a terminal device which includes receiving a control channel including a downlink control information (DCI) format and transmitting a physical uplink shared channel (PUSCH). The DCI format includes an uplink index and information for indicating a hybrid automatic repeat request (HARQ) process number; when both a first bit and a second bit of the uplink index are set to 1, the HARQ process number in the PUSCH corresponding to the first bit is X and the HARQ process number in the PUSCH corresponding to the second bit is mod (X+1, Z); the mod (X+1, Z) is a function outputting a remainder when dividing (X+1) by Z; the X is determined based on the information for indicating the HARQ process number; and the Z is a value identical to a maximum number of HARQ processes in a serving cell determined by an uplink/downlink configuration.

(4) A fourth aspect of the present invention is a communication method for a base station device which includes transmitting a control channel including a downlink control information (DCI) format and receiving a physical uplink shared channel (PUSCH). The DCI format includes an uplink index and information for indicating a hybrid automatic repeat request (HARQ) process number; when both a first bit and a second bit of the uplink index are set to 1, the HARQ process number in the PUSCH corresponding to the first hit is X and the HARQ process number in the PUSCH corresponding to the second bit is mod (X+1, Z); the mod (X+1, Z) is a function outputting a remainder when dividing (X+1) by Z; the X is determined based on the information for indicating the HARQ process number; and the Z is a value identical to a maximum number of HARQ processes in a serving cell determined by an uplink/downlink configuration.

(5) A fifth aspect of the present invention is an integrated circuit, mounted on a terminal device, which includes a reception circuit configured to receive a control channel including a downlink control information (DCI) format and a transmission circuit configured to transmit a physical uplink shared channel (PUSCH). The DCI format includes an uplink index and information for indicating a hybrid automatic repeat request (HARQ) process number; when both a first bit and a second bit of the uplink index are set to 1, the HARQ process number in the PUSCH corresponding to the first bit is X and the HARQ process number in the PUSCH corresponding to the second bit is mod (X+1, Z); the mod (X+1, Z) is a function outputting a remainder when dividing (X+1) by Z; the X is determined based on the information for indicating the HARQ process number; and the Z is a value identical to a maximum number of HARQ processes in a serving cell determined by an uplink/downlink configuration.

(6) A sixth aspect of the present invention is an integrated circuit, mounted on a base station device, which includes a transmission circuit configured to transmit a control channel including a downlink control information (DCI) format and a reception circuit configured to receive a physical uplink shared channel (PUSCH). The DCI format includes an uplink index and information for indicating a hybrid automatic repeat request (HARQ) process number; when both a first bit and a second bit of the uplink index are set to 1, the HARQ process number in the PUSCH corresponding to the first bit is X and the HARQ process number in the PUSCH corresponding to the second bit is mod (X+1, Z); the mod (X+1, Z) is a function outputting a remainder when dividing (X+1) by Z; the X is determined based on the information for indicating the HARQ process number; and the Z is a value identical to a maximum number of HARQ processes in a serving cell determined by an uplink/downlink configuration.

Effects of the Invention

According to the present invention, the terminal device can efficiently communicate with the base station device.

BRIEF DESCRIPTION OF THE DRAWINGS

FIG. 5 is a table showing an example of a UL-DL configuration according to the present embodiment.

FIG. 8 is a table showing an example of the maximum number of HARQ processes which a HARQ entity corresponding to a TDD serving cell manages simultaneously according to the present embodiment.

FIG. 9 is a table showing another example of the maximum number of the HARQ processes which a HARQ entity corresponding to a TDD serving cell manages simultaneously according to the present embodiment.

MODE FOR CARRYING OUT THE INVENTION

Embodiments of the present invention will be described below.

Figure 1:
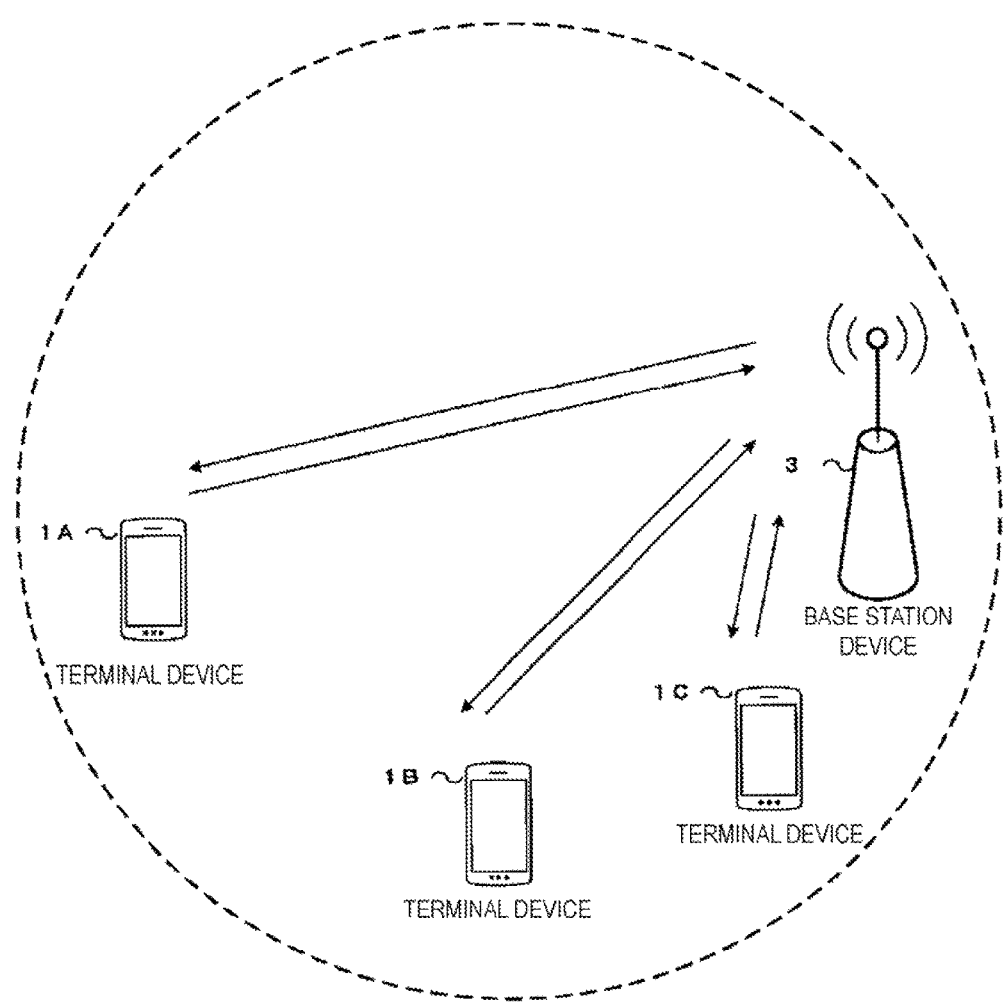
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. The terminal devices 1A to 1C are each referred to as a terminal device 1 below.

Carrier aggregation will be described below.

In the present embodiment, multiple serving cells are configured for the terminal device 1. A technology in which the terminal device 1 communicates via the multiple serving cells is referred to as cell aggregation or carrier aggregation. The present invention may be applied to each of the multiple serving cells configured for the terminal device 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells. In carrier aggregation, multiple serving cells being configured are also referred to as aggregated serving cells.

Time division duplex (TDD) and/or frequency division duplex (FDD) is applied to a radio communication system according to the present embodiment. For cell aggregation, the FDD may be applied to all of the multiple serving cells.

For the cell aggregation, the TDD may be applied to all of the multiple serving cells. Alternatively, serving cells to which the TDD is applied and serving cells to which the FDD is applied may be aggregated.

The multiple serving cells being configured include one primary cell and one or multiple secondary cells. The primary cell is a cell in which an initial connection establishment procedure is executed, a cell in which a connection re-establishment procedure is started, or a cell indicated as a primary cell in a handover procedure. Secondary cells may be configured/added at a point in time of or after the establishment of a radio resource control (RRC) connection.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. In the FDD, the uplink component carrier and the downlink component carrier correspond to different carrier frequencies. In the TDD, the uplink component carrier and the downlink component carrier correspond to the same carrier frequency.

The terminal device 1 can perform simultaneous transmission and/or reception on multiple physical channels in multiple serving cells (component carriers). A single physical channel is transmitted in a single serving cell (component carrier) of the multiple serving cells (component carriers).

Figure 2:
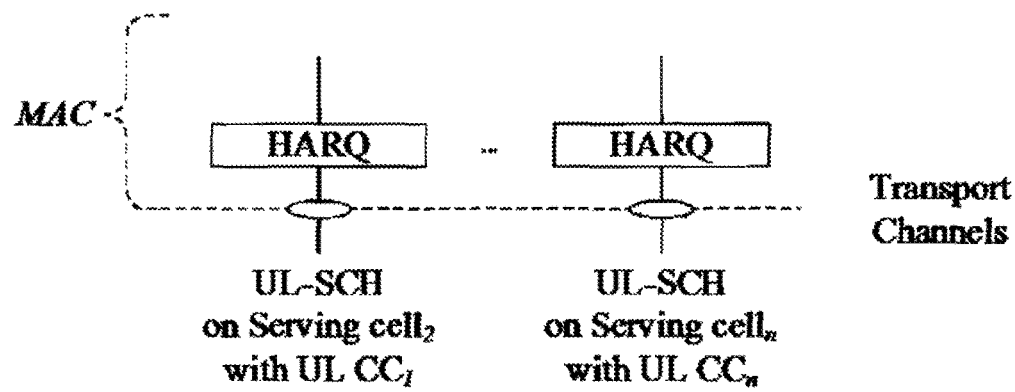
FIG. 2 is a diagram illustrating an example of a MAC layer structure in an uplink in which a carrier aggregation scheme configured according to the present embodiment.

FIG. 2 illustrates an example of a medium access control (MAC) layer structure in the uplink with carrier aggregation being configured according to the present embodiment. In the uplink with carrier aggregation being configured, one independent HARQ entity exists for each serving cell (uplink component carrier). The HARQ entity manages multiple HARQ processes simultaneously. The HARQ process relates to a HARQ buffer. Accordingly, the HARQ entity relates to the multiple HARQ buffers. The HARQ process stores MAC layer data in the HARQ buffer. The HARQ process instructs a physical layer to transmit the MAC layer data.

In the uplink with carrier aggregation being configured, at least one transport block is generated in each serving cell per transmission time interval (TTI). Each transport block and HARQ retransmission of the transport block are mapped in a serving cell. In LTE, TTI is a subframe. The transport block is the MAC layer data transmitted on an uplink shared channel (UL-SCH).

In the uplink according to the present embodiment, "transport block", "MAC protocol data unit (VDU)", "MAC layer data", "UL-SCH", "UL-SCH data", and "uplink data" denote the same constituent element.

Physical channels and physical signals according to the present embodiment will be described below.

The uplink radio communication from the terminal device 1 to the base station device 3 uses the following uplink physical channels. The uplink physical channels are used to transmit information output from a higher layer.

Physical uplink control channel (PUCCH)
Physical uplink shared channel (PUSCH)
Physical random access channel (PRACH)

The PUCCH is used to transmit uplink control information (UCI). The uplink control information includes downlink channel state information (CSI), a scheduling request (SR) used to request a PUSCH (uplink-shared channel (UL-SCH)) resource for initial transmission, and hybrid automatic repeat request ACKnowledgement (HARQ-ACK) corresponding to the downlink data (transport block, a MAC protocol data unit (MAC PDU), a downlink-shared channel (DL-SCH), and a physical downlink shared channel (PDSCH)). The HARQ-ACK indicates an acknowledgement (ACK) or a negative-acknowledgement (NACK). The HARQ-ACK is also referred to as an ACK/NACK, HARQ feedback, a HARQ response, or HARQ control information.

The scheduling request includes a positive scheduling request or a negative scheduling request. The positive scheduling request requests a UL-SCH resource for initial transmission. The negative scheduling request does not request a UL-SCH resource for the initial transmission.

The PUSCH is used to transmit uplink data (uplink-shared channel (UL-SCH)). Furthermore, the PUSCH may be used to transmit the HARQ-ACK and/or channel state information along with the uplink data. Further, the PUSCH may transmit only the channel state information. Moreover, the PUSCH may transmit only the HARQ-ACK and the channel state information.

Here, the base station device 3 and the terminal device 1 exchange (transmit and receive) signals with each other in higher layers. The base station device 3 and terminal device 1, for instance, may transmit and receive radio resource control (RRC) signaling in an RRC layer. Further, the base station device 3 and terminal device 1 may transmit and receive a MAC CE in the medium access control (MAC) layer. Here, the RRC signaling and/or the MAC CE is also referred to as higher layer signaling. The RRC signaling and/or the MAC CE are included in the transport block.

In the present embodiment, the "RRC signaling", "RRC layer information", an "RRC layer signal", an "RRC layer parameter", an "RRC message", and an "RRC information element" denote the same constituent element.

The PUSCH is used to transmit the RRC signaling and the MAC CE. Here, the RRC signaling transmitted from the base station device 3 may be signaling common to multiple terminal devices 1 in a cell. Further, the RRC signaling transmitted from the base station device 3 may be dedicated to a certain terminal device 1 (also referred to as dedicated signaling). In other words, user-device-specific information (unique to user device) is transmitted through the signaling dedicated to the certain terminal device 1.

The PRACH is used to transmit a random access preamble. The PRACH is used to indicate an initial connection establishment procedure, a handover procedure, a connection re-establishment procedure, uplink transmission synchronization (timing adjustment), and a PUSCH (UL-SCH) resource request.

The following uplink physical signals are used in the uplink radio communication. The uplink physical signal is not used to transmit information output from the higher layer, but is used by a physical layer.

Uplink reference signal (UL RS)

The following downlink physical channels are used for the downlink radio communication from the base station device 3 to the terminal device 1. The downlink physical channels are used to transmit the information output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel EPDCCH)
Physical downlink shared channel (PDCCH)
Physical multicast channel (PMCH)

The PBCH is used to broadcast a master information block (MIB), or a broadcast channel (BCH), that is shared by the terminal devices 1.

The PCFICH is used to transmit information indicating a region (OFDM symbols) to be used for transmission of the PDCCH.

The PHICH is used to transmit a HARQ indicator (HARQ feedback or acknowledgement information) indicating acknowledgement (ACK) or negative acknowledgement (NACK) with respect to the uplink data (uplink shared channel (UL-SCH)) received by the base station device 3.

The PDCCH and the EPDCCH are used to transmit downlink control information (DCI). For the sake of convenience, in the present embodiment, "PDCCH" includes "EPDCCH". The downlink control information is also referred to as a DCI format. The downlink control information transmitted on a single PDCCH includes a downlink grant and HARQ information, or an uplink grant and HARQ information. The downlink grant is also referred to as downlink assignment or downlink allocation. The downlink assignment and the uplink grant are not transmitted together in a single PDCCH.

Figure 3:
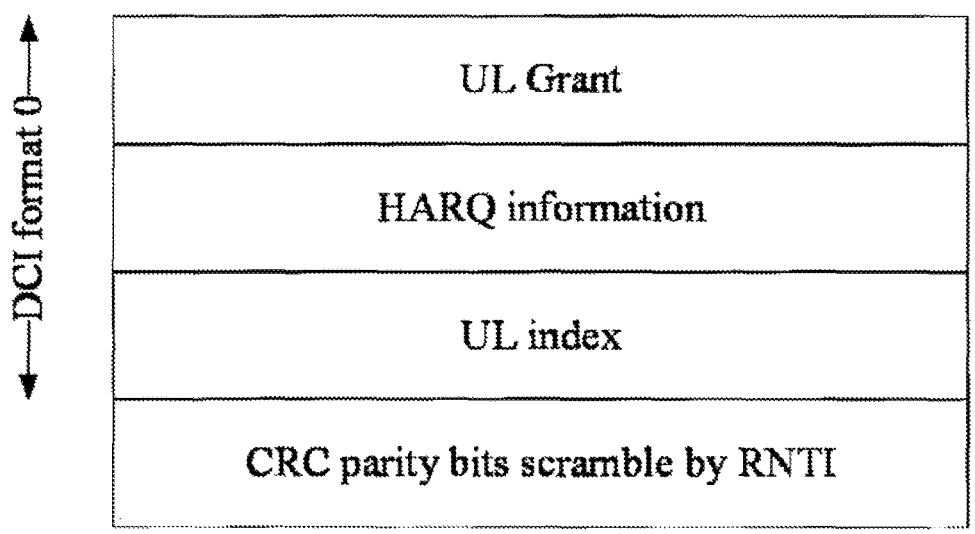
FIG. 3 is a diagram illustrating an example of a downlink control information (DCI) format 0 according to the present embodiment.

FIG. 3 is a diagram illustrating an example of a DCI format 0 according to the present embodiment. The DCI format 0 includes the uplink grant and the HARQ information. The DCI format 0 corresponding to the serving cell in which an uplink-downlink configuration (UL-DL configuration) 0 is configured may include a UL index field. The UL index indicates a subframe to which the PUSCH transmission scheduled by the DCI format 0 is adjusted. The UL index includes a first bit and a second bit. The terminal device 1 adjusts the PUSCH transmission to a first subframe when "1" is set to the first bit of the UL index. The terminal device 1 adjusts the PUSCH transmission to a second subframe when "1" is set to the second bit of the UL index. The terminal device 1 adjusts the PUSCH transmission to each of the first and second subframes when "1" is set to both the first and second bits of the UL index.

The downlink assignment is used to schedule a single PDSCH in a single cell. The downlink assignment is used to schedule the PDSCH in the same subframe to which the downlink grant has been transmitted.

The uplink grant is used for scheduling of a single PUSCH within a single cell. The uplink grant is used to schedule a single PUSCH in the subframe which follows the subframe to which the uplink grant has been transmitted.

The HARQ information includes a new data indicator (NUI) and information indicating the transport block size. The HARQ information transmitted on the PDCCH with the downlink assignment also includes information indicating a HARQ process number in the downlink (downlink HARQ process Identifier/Identity, downlink HARQ process number). The HARQ information transmitted on the PDCCH with the uplink grant related to asynchronous HARQ may also include information indicating a HARQ process number in the uplink (uplink HARQ process Identifier/Identity, uplink HARQ process number). The HARQ information transmitted on the PDCCH with the uplink grant related to synchronous HARQ may not include information indicating a HARQ process number in the uplink (uplink HARQ process Identifier/Identity, uplink HARQ process number).

The NDI indicates initial transmission or retransmission. The HARQ entity instructs a certain HARQ process to trigger initial transmission when the NDI provided to the certain HARQ process by the HARQ information is toggled in comparison with the NDI value for the previous transmission of the certain HARQ process. The HARQ entity instructs a certain HARQ process to trigger retransmission when the NDI provided to the certain HARQ process by the HARQ information is not toggled in comparison with the NDI value for the previous transmission of the certain HARQ process. The HARQ process may determine whether or not the NDI is toggled.

The HARQ entity identifies a HARQ process related to the uplink grant and the HARQ information, and delivers the uplink grant and the HARQ information to the identified HARQ process. The HARQ process stores the uplink grant and the HARQ information delivered from the HARQ entity.

A cyclic redundancy check (CRC) parity bit added to the downlink control information transmitted on one PDCCH is scrambled with a cell-radio network temporary identifier (C-RNTI), a semi persistent scheduling (SPS) C-RNTI, or a temporary C-RNTI. The C-RNTI and SPS C-RNTI are identifiers for identifying a terminal device in a cell. The temporary C-RNTI is an identifier for identifying the terminal device 1 having transmitted a random access preamble during a contention based random access procedure.

The C-RNTI and temporary C-RNTI are used to control the PDSCH transmission or the PUSCH transmission in a single subframe. The SPS C-RNTI is used to periodically allocate a resource for the PDSCH or the PUSCH.

The PDSCH is used to transmit downlink data (downlink shared channel (DL-SCH)).

The PMCH is used to transmit multicast data (multicast channel (MCH)).

The following downlink physical signals are used in the downlink radio communication. The downlink physical signals are not used to transmit the information output from the higher layer, but are used by the physical layer.

Synchronization signal (SS)
Downlink reference signal (DL RS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal device 1 to perform channel compensation on the downlink physical channel. The downlink reference signal is used in order for the terminal device 1 to calculate the downlink channel state information.

According to the present embodiment, the following five types of downlink reference signals are used.

Cell-specific reference signal (CRS)
UE-specific reference signal (URS) associated with the PDSCH
Demodulation reference signal (DMRS) associated with the EPDCCH
Non-zero power chattel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the UL-SCH are transport channels. Channels used in medium access control (MAC) layers are referred to as transport channels. A unit of the transport channel used in the MAC layers is also referred to as a transport block (TB) or a MAC protocol data unit (PDU). Control of a hybrid automatic repeat request (HARQ) is performed on each transport block in the MAC layer. The transport block is a unit of data that the MAC layer delivers to the physical layer. In the physical layer, the transport block is mapped to a codeword and subject to coding processing on a codeword-by-codeword basis.

The structure of the radio frame in the present embodiment will be described below.

LTE supports two types of radio frame structure. The two types of radio frame structure are a frame structure type 1 and a frame structure type 2. The frame structure type 1 can be applied to the FDD. The frame structure type 2 can be applied to the TDD.

Figure 4:
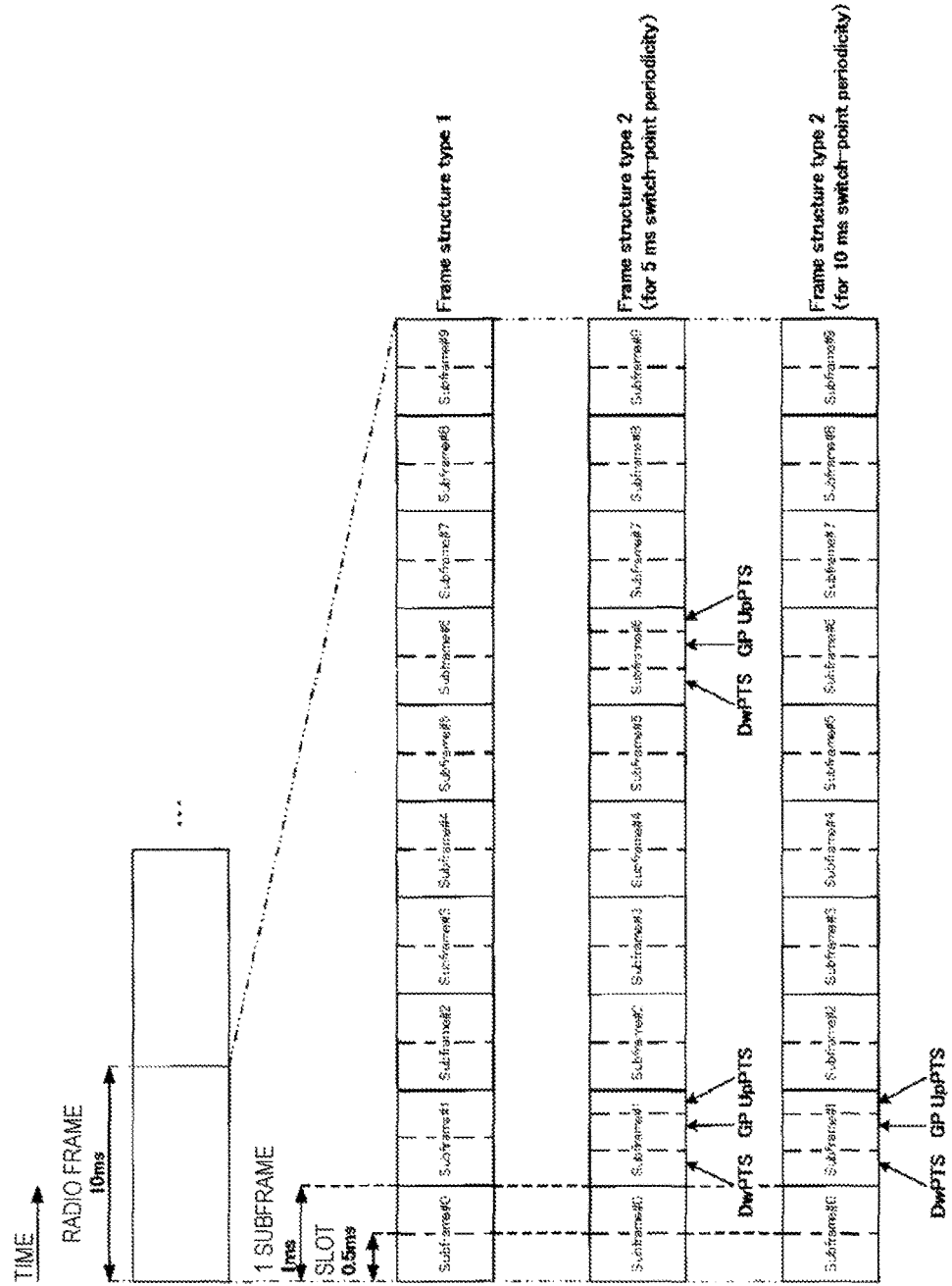
FIG. 4 is a diagram illustrating a schematic configuration of a radio frame according to the present embodiment.

FIG. 4 is a diagram illustrating a schematic configuration of the radio frame according to the present embodiment. In FIG. 4, the horizontal axis is a time axis. Each of the type 1 and type 2 radio frames is 10 ms in length and is defined by 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot.

The following three types of subframes are defined in the frame structure type 2.

Downlink subframe
Uplink subframe
Special subframe

The downlink subframe is a subframe reserved for downlink transmission. The uplink subframe is a subframe reserved for uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted only of the DwPTS and the UP, or may be constituted only of the GP and the UpPTS.

A radio frame of the frame structure type 2 is constituted of at least the downlink subframe, the uplink subframe, and the special subframe. The constitution of the radio frame of the frame structure type 2 is indicated by the uplink-downlink configuration (UL-DL configuration). The terminal device 1 receives information indicating the UL-DL configuration from the base station device 3. FIG. 5 is a table showing an example of the UL-DL configuration according to the present embodiment. In FIG. 5, D denotes a downlink subframe, U denotes an uplink subframe, and S denotes a special subframe.

A synchronous HARQ in uplink will be described below.

In the synchronous HARQ, the HARQ process to which the uplink grant corresponds is associated with the subframe having received the uplink grant and/or the subframe from which the PUSCH (UL-SCH) corresponding to the uplink grant is transmitted. The terminal device 1, in the synchronous HARQ, determines the HARQ process to which the uplink grant corresponds by the subframe having received the uplink grant and/or the subframe from which the PUSCH (UL-SCH) corresponding to the uplink grant is transmitted.

Figure 6:
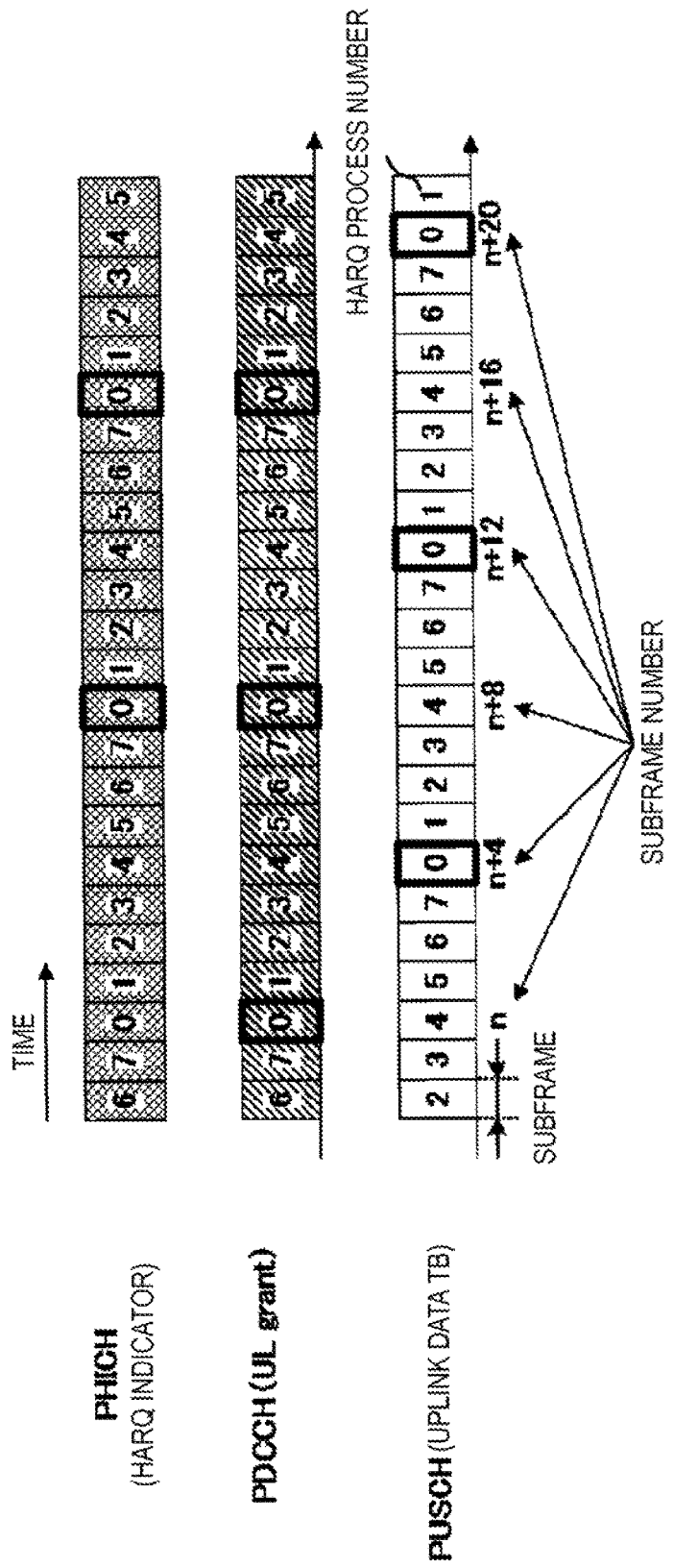
FIG. 6 is a diagram illustrating an example of a synchronous HARQ according to the present embodiment.

FIG. 6 is a diagram illustrating an example of a synchronous HARQ according to the present embodiment. In FIG. 6, one subframe corresponds to one HARQ process. In FIG. 6, the numeral in a box indicates the corresponding HARQ process number. In the synchronous HARQ, the HARQ entity determines the HARQ process by the subframe from which the MAC layer data is transmitted or by the subframe having detected the DCI format 0 corresponding to the MAC layer data.

In FIG. 6, a subframe from which the MAC layer data corresponding to the uplink grant is transmitted is determined by the subframe having received the uplink grant. For example, the MAC layer data corresponding to the uplink grant is transmitted on the PUSCH in the subframe located four subframes behind the subframe having received the stated uplink grant.

In the synchronous HARQ, a HARQ indicator is transmitted on the PHICH in response to the uplink transmission. The relation between the subframe where the uplink transmission has been executed and the subframe where the corresponding PHICH is transmitted is predetermined. For example, a HARQ indicator corresponding to the MAC layer data is transmitted on the PHICH at the subframe located four subframes behind the subframe in which the stated MAC layer data has been transmitted on the PUSCH. Further, for example, the MAC layer data is retransmitted on the PUSCH at the subframe located four subframes behind the subframe having received NACK on the PHICH.

An asynchronous HARQ in the uplink will be described below.

Figure 7:
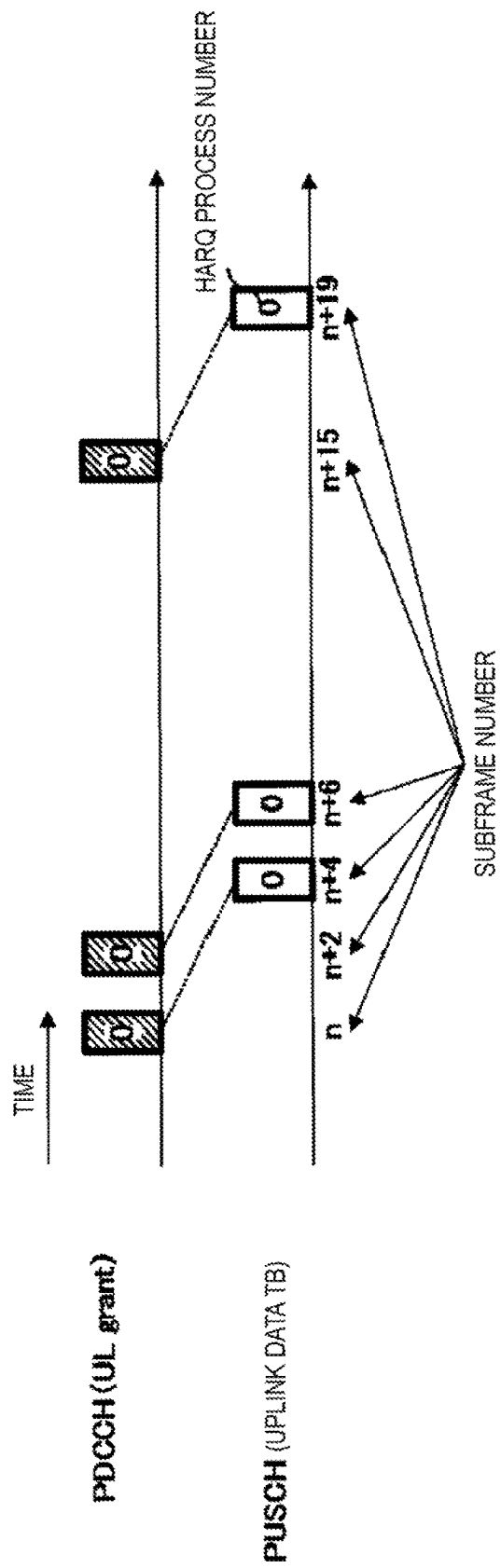
FIG. 7 is a diagram illustrating an example of an asynchronous HARQ according to the present embodiment.

FIG. 7 is a diagram illustrating an example of the asynchronous HARQ according to the present embodiment. In FIG. 7, one subframe corresponds to one HARQ process. In FIG. 7, the numeral in a box indicates the corresponding HARQ process number. In the asynchronous HARQ, a HARQ entity determines the HARQ process by the HARQ information (information indicating a HARQ process number) included in the DCI format 0. In the asynchronous HARQ, a HARQ indicator is not transmitted on the PHICH in response to the uplink transmission. Thus, in the asynchronous HARQ, retransmission of the MAC layer data is always scheduled via the PDCCH.

In FIG. 7, the subframe where the MAC layer data corresponding to the uplink grant is transmitted is determined by the subframe having received the uplink grant. For example, the MAC layer data corresponding to the uplink grant is transmitted on the PUSCH in the subframe located four subframes behind the subframe having received the stated uplink grant.

When the DCI format 0 includes a UL index, the DCI format may include two pieces of information indicating a HARQ process. When the DCI format 0 includes the UL index, and both a first bit and a second bit in the UL index are set to "1", one of two HARQ processes indicated by the two pieces of information which indicate the HARQ process numbers may correspond to a first subframe to which the PUSCH transmission is adjusted, and the other of the two HARQ processes indicated by the two pieces of information which indicate the HARQ process numbers may correspond to a second subframe.

When the DCI format 0 includes the UL index, the DCI format may include one piece of information indicating a HARQ process. When the DCI format 0 includes the UL index, and both the first bit and the second bit in the UL index are set to "1", one HARQ process indicated by one piece of information which indicates the HARQ process number may correspond to both the first subframe and the second subframe to each of which the PUSCH transmission is adjusted.

When the DCI format 0 includes the UL index in which the first bit is set to "1" and the second bit is set to "0", one HARQ process X indicated by the HARQ information (information indicating the HARQ process number) may correspond to the PUSCH transmission adjusted to the first subframe. When the DCI format 0 includes the UL index in which the first bit is set to "0" and the second bit is set to "1", the one HARQ process X indicated by the HARQ information (information indicating a HARQ process number) may correspond to the PUSCH transmission adjusted to the second subframe. When the DCI format 0 includes the UL index in which both the first bit and the second bit are set to "1", the one HARQ process X indicated by the HARQ information (information indicating a HARQ process number) may correspond to the PUSCH transmission (PUSCH transmission corresponding to the first bit) adjusted to the first subframe, and a HARQ process Y determined by the HARQ process X may correspond to the PUSCH transmission (PUSCH transmission corresponding to the second bit) adjusted to the second subframe. Here, X and Y may have a relation of Y=(X+1) mod Z. Here, Z denotes the maximum number of the HARQ processes which are simultaneously managed by the HARQ entity. In other words, the HARQ process number for the PUSCH corresponding to the second bit in the UL index is determined at least based on whether or not both the first bit and the second hit in the UL index are set to 1, and on the information for indicating the HARQ process number.

The maximum number Z of the HARQ processes which are simultaneously managed by one HARQ process will be described below.

One HARQ entity corresponding to a FDD serving cell simultaneously manages eight HARQ processes. The information indicating a HARQ process number included in the DCI format 0 corresponding to a FDD serving cell to which an asynchronous HARQ is applied may be 3 bits.

FIG. 8 is a diagram illustrating an example of the maximum number of the HARQ processes which are simultaneously managed by a HARQ entity corresponding to a TDD serving cell according to the present embodiment. The maximum number of the HARQ processes which are managed by one HARQ entity corresponding to the TDD serving cell may be determined by a UL-DL configuration configured for the TDD serving cell. Information indicating the HARQ process number included in the DCI format 0 corresponding to the TDD serving cell to which the asynchronous HARQ is applied may be determined by the UL-DL configuration configured for the TDD serving cell. In FIG. 8, when the UL-DL configuration 5 is configured for the TDD serving cell to which the asynchronous HARQ is applied, the information indicating the HARQ process number included in the DCI format 0 corresponding to the TDD serving cell is 0 bit.

FIG. 9 is a diagram illustrating another example of the maximum number of the HARQ processes which are simultaneously managed by the HARQ entity corresponding to the TDD serving cell according to the present embodiment. The maximum number of the HARQ processes which are managed by one HARQ entity corresponding to the TDD serving cell may be based on whether the synchronous HARQ or the asynchronous HARQ is applied to the TDD serving cell. In FIG. 9, when the synchronous HARQ is applied to the TDD serving cell, the maximum number of the HARQ processes which are managed by one HARQ entity corresponding to the TDD serving cell is determined by the UL-DL configuration configured for the TDD serving cell. In FIG. 9, when asynchronous HARQ is applied to the TDD serving cell, the maximum number of the HARQ processes which are managed by one HARQ entity corresponding to the TDD serving cell is eight regardless of the UL-DL configuration.

The number of bits of the information indicating the HARQ process number included in the DCI format 0 corresponding to the TDD serving cell may be based on whether the synchronous HARQ or the asynchronous HARQ is applied to the TDD serving cell. In FIG. 9, when asynchronous HARQ is applied to the TDD serving cell, the number of bits of the information indicating the HARQ process number included in the DCI format 0 corresponding to the TDD serving cell is three regardless of the configuration.

The configuration related to HARQ in the RRC layer will be described below with reference to FIG. 10 to FIG. 13.

The terminal device 1 may control whether the synchronous HARQ or asynchronous HARQ is applied to each serving cell including an uplink component carrier or to each HARQ entity. In other words, the synchronous HARQ-applied HARQ process and the asynchronous HARQ-applied HARQ process may not correspond to the same serving cell. Thus, the synchronous HARQ-applied HARQ process and the asynchronous HARQ-applied HARQ process may not correspond to the same HARQ entity.

The base station device 3 may transmit, the RRC layer information indicating the asynchronous HARQ to the terminal device 1 with respect to a certain serving cell. The terminal device 1, in the case the RRC layer information indicating the asynchronous HARQ being configured in the RRC layer, may apply the asynchronous HARQ to the corresponding serving cell (transmission in the corresponding serving cell). The terminal device 1, in the case the RRC layer information indicating the asynchronous HARQ being not configured in the RRC layer, may apply the synchronous HARQ to the corresponding serving cell. The RRC layer information indicating the asynchronous HARQ may be the information indicating asynchronous HARQ enabling.

The base station device 3 may transmit, to the terminal device 1, the RRC layer information indicating the synchronous HARQ or asynchronous HARQ with respect to a certain serving cell. The terminal device 1, in the case the RRC layer information indicating the asynchronous HARQ being configured in the RRC layer, may apply the asynchronous HARQ to the corresponding serving cell. The terminal device 1, in the case the RRC layer information indicating the synchronous HARQ being not configured in the RRC layer, may apply the synchronous HARQ to the corresponding serving cell.

Figure 10:
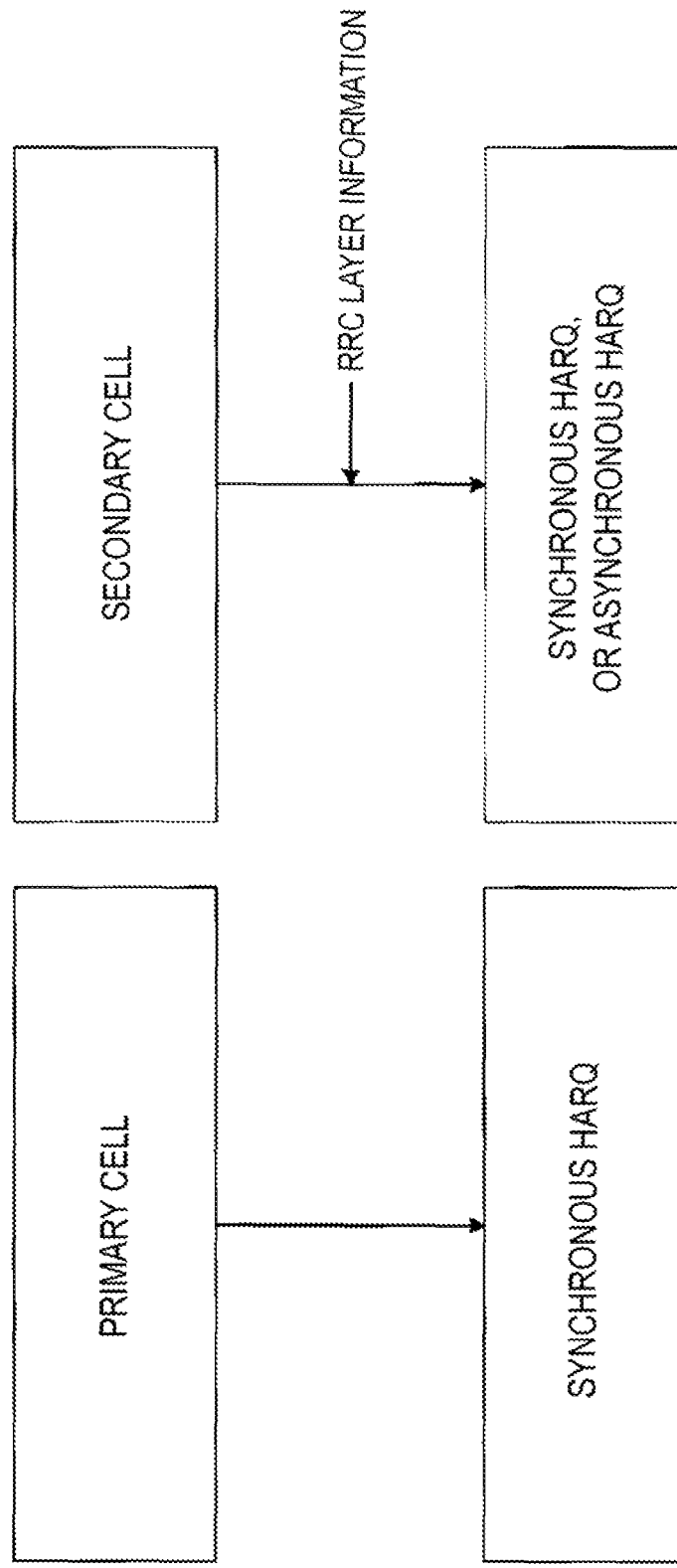
FIG. 10 is a diagram illustrating a first example of a measure for switching between the synchronous HARQ and the asynchronous HARQ according to the present embodiment.

FIG. 10 is a diagram illustrating a first example of a measure for switching between the synchronous HARQ and the asynchronous HARQ according to the present embodiment. In FIG. 10, whether synchronous HARQ or asynchronous HARQ is applied in the serving cell uplink is determined by the type of the serving cell (the primary cell, the secondary cell). In FIG. 10, regardless of the RRC layer information, the synchronous HARQ is always applied to a primary cell uplink (uplink transmission in the primary cell). In FIG. 10, the synchronous HARQ or the asynchronous HARQ is applied to a secondary cell uplink (uplink transmission in the secondary cell) based on the RRC layer information corresponding to the secondary cell. With the above configuration, the primary cell can control that the synchronous HARQ is always applied to the primary cell in the uplink; and the RRC layer can control whether the synchronous HARQ or asynchronous HARQ is applied to the secondary cell.

Figure 11:
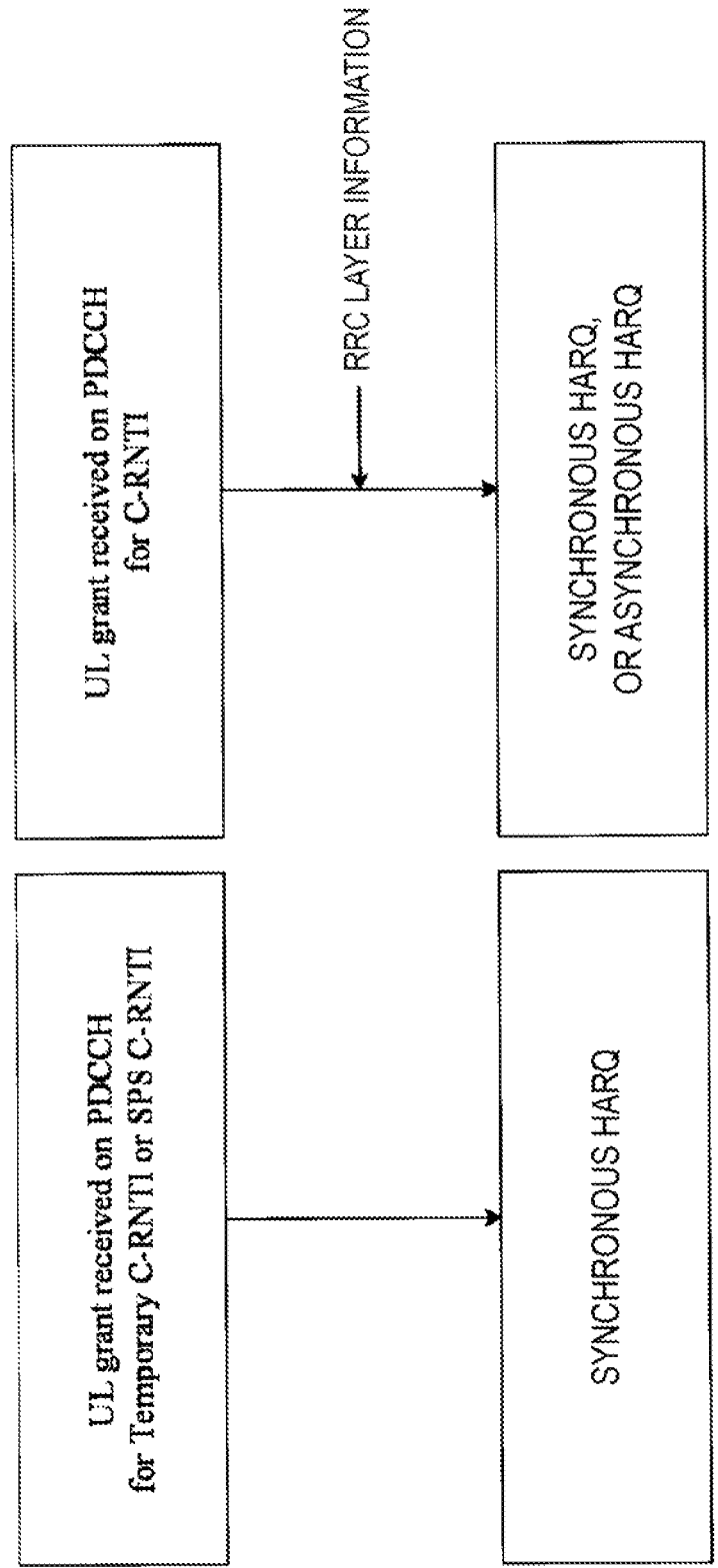
FIG. 11 is a diagram illustrating a second example of the measure for switching between the synchronous HARQ and the asynchronous HARQ according to the present embodiment.

FIG. 11 is a diagram illustrating a second example of a measure for switching between the synchronous HARQ and the asynchronous HARQ according to the present embodiment. In FIG. 11, whether the synchronous HARQ or the asynchronous HARQ is applied in the uplink is determined by a radio network temporary identifier (RNTI) to which the uplink grant corresponds. In FIG. 11, regardless of the RRC layer information, the synchronous HARQ is always applied to the MAC layer data (uplink data transmission) corresponding to the uplink grant received on the PDCCH including the CRC parity bit scrambled by the temporary C-RNTI or the SPS C-RNTI. In FIG. 11, based on the RRC layer information, the synchronous HARQ or the asynchronous HARQ is applied to the MAC layer data corresponding to the uplink grant received on the PDCCH including the CRC parity bit scrambled by the C-RNTI.

Figure 12:
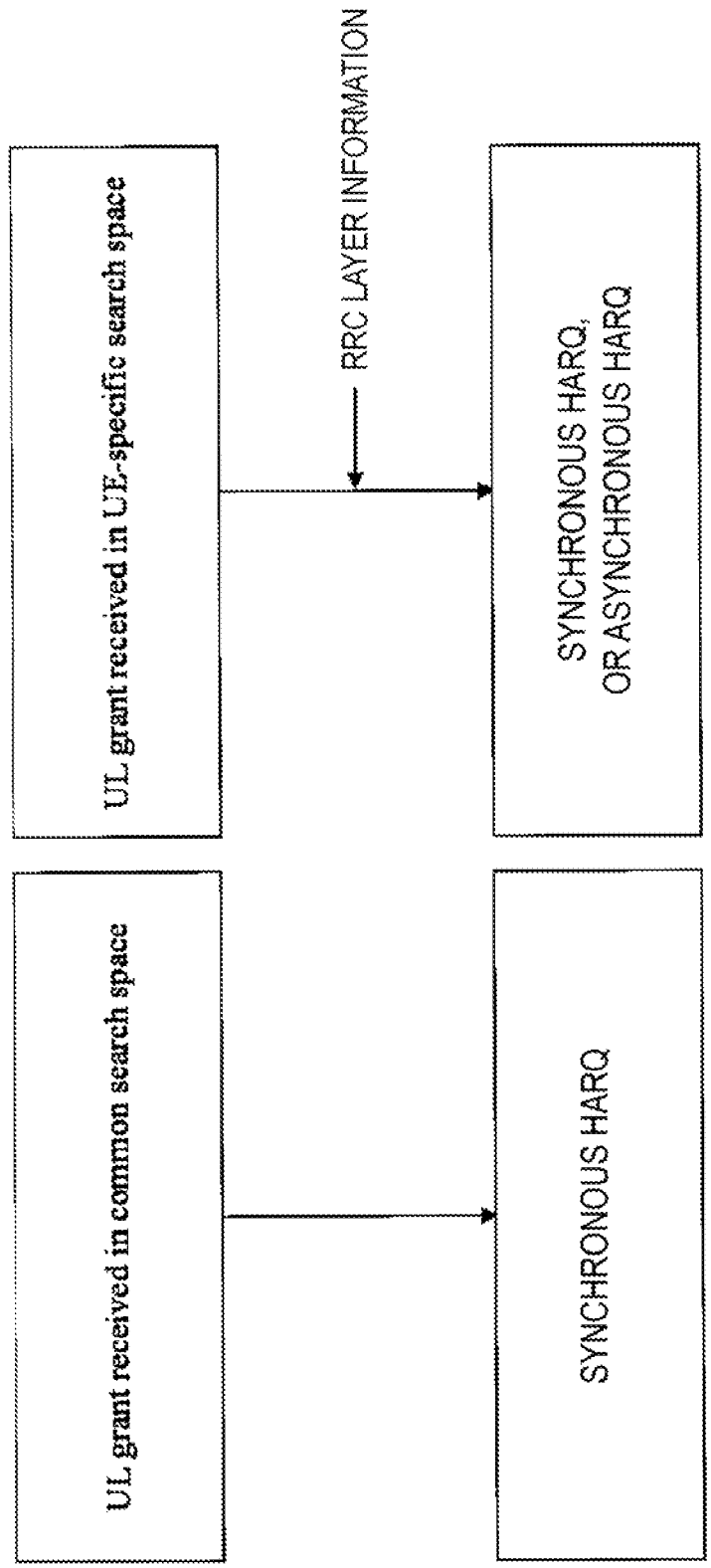
FIG. 12 is a diagram illustrating a third example of the measure for switching between the synchronous HARQ and the asynchronous HARQ according to the present embodiment.

FIG. 12 is a diagram illustrating a third example of a measure for switching between the synchronous HARQ and the asynchronous HARQ according to the present embodiment. In FIG. 12, in the uplink, whether the synchronous HARQ or the asynchronous HARQ is applied is determined by the type of a search space where the uplink grant has been received. In FIG. 12, regardless of the RRC layer information, the synchronous HARQ is always applied to the MAC layer data corresponding to the uplink grant received in a common search space. In FIG. 12, based on the RRC layer information, the synchronous HARQ or the asynchronous HARQ is applied to the MAC layer data corresponding to the uplink grant received in a UE-specific search space.

The UE-specific search space is at least determined by the C-RNTI value set by the terminal device 1. That is, the respective UE-specific search spaces are individually determined for each terminal device 1. In other words, the common search space is a search space common to the multiple terminal devices 1. The terminal devices 1 supporting asynchronous HARQ and the terminal devices 1 not supporting asynchronous HARQ share the common search space. In addition, the common search space broadcasts the common PDCCH to the terminal devices 1 supporting the asynchronous HARQ and the terminal devices 1 not supporting the asynchronous HARQ. Consequently, the DCI format 0 transmitted in the common search space is preferably the same payload size as before. Thus, the DCI format 0 transmitted in the common search space does not include information for indicating a HARQ process number. Only the DCI format 0 transmitted in the UE-specific search space includes the information for indicating a HARQ process number. The synchronous is always applied to the MAC layer data corresponding to the uplink grant received in the common search space, whereby addition of the information for indicating a HARQ process number to the DCI format 0 transmitted in the common search space becomes unnecessary, and the payload size of the DCI format 0 transmitted in the common search space is the same as before.

Figure 13:
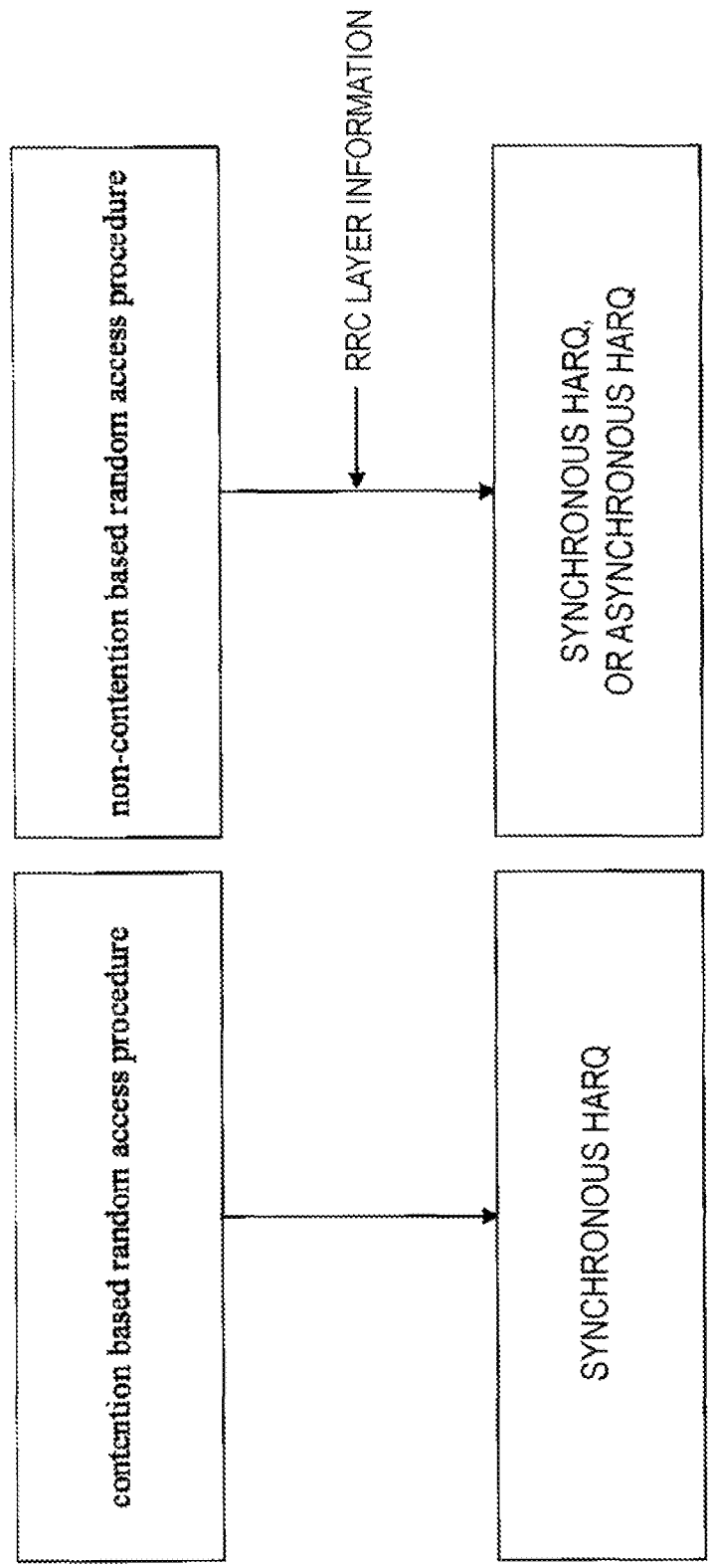
FIG. 13 is a diagram illustrating a fourth example of the measure for switching between the synchronous HARQ and the asynchronous HARQ according to the present embodiment.

FIG. 13 is a diagram illustrating a fourth example of a measure for switching between the synchronous HARQ and the asynchronous HARQ according to the present embodiment. In FIG. 13, whether the synchronous HARQ or asynchronous HARQ is applied in the uplink is determined by the type of the random access procedure. In FIG. 13, regardless of the RRC layer information, the synchronous HARQ is always applied to the MAC layer data corresponding to the uplink grant included in a random access response associated with a contention based random access procedure. In FIG. 13, based on the RRC layer information, the synchronous HARQ or the asynchronous HARQ is applied to the MAC layer data corresponding to the uplink grant included in the random access response associated with a non-contention based random access procedure.

In FIG. 11 to FIG. 13, the asynchronous HARQ may be applied to the primary cell. In the above case, the synchronous HARQ may be applied to transmission of a random access message 3 in the primary cell. Further, the synchronous HARQ may be applied to the MAC layer data corresponding to the uplink grant received in the common search space in the primary cell.

Although the first to fourth examples of the measure for switching between the synchronous HARQ and the asynchronous HARQ have been described with reference to FIG. 10 to FIG. 13, the specific configuration is not limited to the first to fourth examples, and includes, for example, an amendment to a design that falls within the scope that does not depart from the gist of the present invention. Furthermore, embodiments obtained by suitably combining technical means disclosed according to the first to fourth examples of the present embodiment are also included in the technical scope of the present invention.

The random access procedures will be described below.

The random access procedure may be executed on the primary cell and secondary cell according to the present embodiment. However, only one random access procedure is executed in any point of the time domain. That is, multiple random access procedures are not executed simultaneously.

In the primary cell, both the contention based random access procedure and the non-contention based random access procedure may be executed according to the present embodiment. In the secondary cell, the non-contention based random access procedure may be executed according to the present embodiment. In the secondary cell, the contention based random access procedure is not executed according to the present embodiment.

The random access preamble may be transmitted on the PRACH in the primary cell. The terminal device 1 receives information (RRC message) related to the random access procedure in the primary cell from the base station device 3. The information related to the random access procedure in the primary cell includes information indicating a setting of PRACH resources in the primary cell.

The random access preamble may be transmitted on the PRACH in the secondary cell. The terminal device 1 receives the information (RRC message) related to the random access procedure in the secondary cell from the base station device 3. The information related to the random access procedure in the secondary cell includes information indicating a setting of the PRACH resources in the secondary cell.

In the contention based random access procedure, the terminal device 1 itself selects a random access preamble index. In the non-contention based random access procedure, the random access preamble index is selected based on the information received from the base station device 3 by the terminal device 1. When all the bit values in the information received from the base station device 3 are 0, the terminal device 1 executes the contention based random access procedure, and the terminal device 1 itself selects the random access preamble index.

The random access response to the primary cell or the secondary cell is transmitted on the PDSCH in the primary cell. The random access response includes an uplink grant field mapped on the uplink grant and a temporary C-RNTI field mapped on the information for indicating the temporary C-INTI. The uplink grant included in the random access response is also referred to as a random access response grant.

In a case that the received random access response includes a random access preamble identifier corresponding to the transmitted random access preamble and the terminal device 1 selects a random access preamble based on the information received from the base station device 3, the terminal device 1 considers that the non-contention based random access procedure has successfully been completed, and transmits the PUSCH based on the uplink grant included in the random access response.

In a case that the received random access response includes a random access preamble identifier corresponding to the transmitted random access preamble and the terminal device 1 itself selects the random access preamble, the terminal device 1 sets the temporary C-RNTI to the temporary C-RNTI field value included in the received random access response, and transmits the random access message 3 on the PUSCH based on the uplink grant included in the random access response.

The PUSCH corresponding to the uplink grant included in the random access response is transmitted at the serving cell in which the corresponding preamble has been transmitted on the PRACH.

When the temporary C-RNTI is not set, the PUSCH corresponding to the uplink grant included in the random access response and the PUSCH retransmission in the same transport block are scrambled based on the C-RNTI.

When the temporary C-RNTI is set, the PUSCH corresponding to the uplink grant included in the random access response and the PUSCH retransmission in the same transport block are scrambled based on the temporary C-RNTI.

When the temporary C-RNTI is set, the PUSCH retransmission of the transport block transmitted on the PUSCH corresponding to the uplink grant included in the random access response is scheduled by the DCI format 0 to which the CRC parity bit scrambled by the temporary C-RNTI is added. The DCI format 0 is transmitted on the PDCCH in the common search space.

Figure 14:
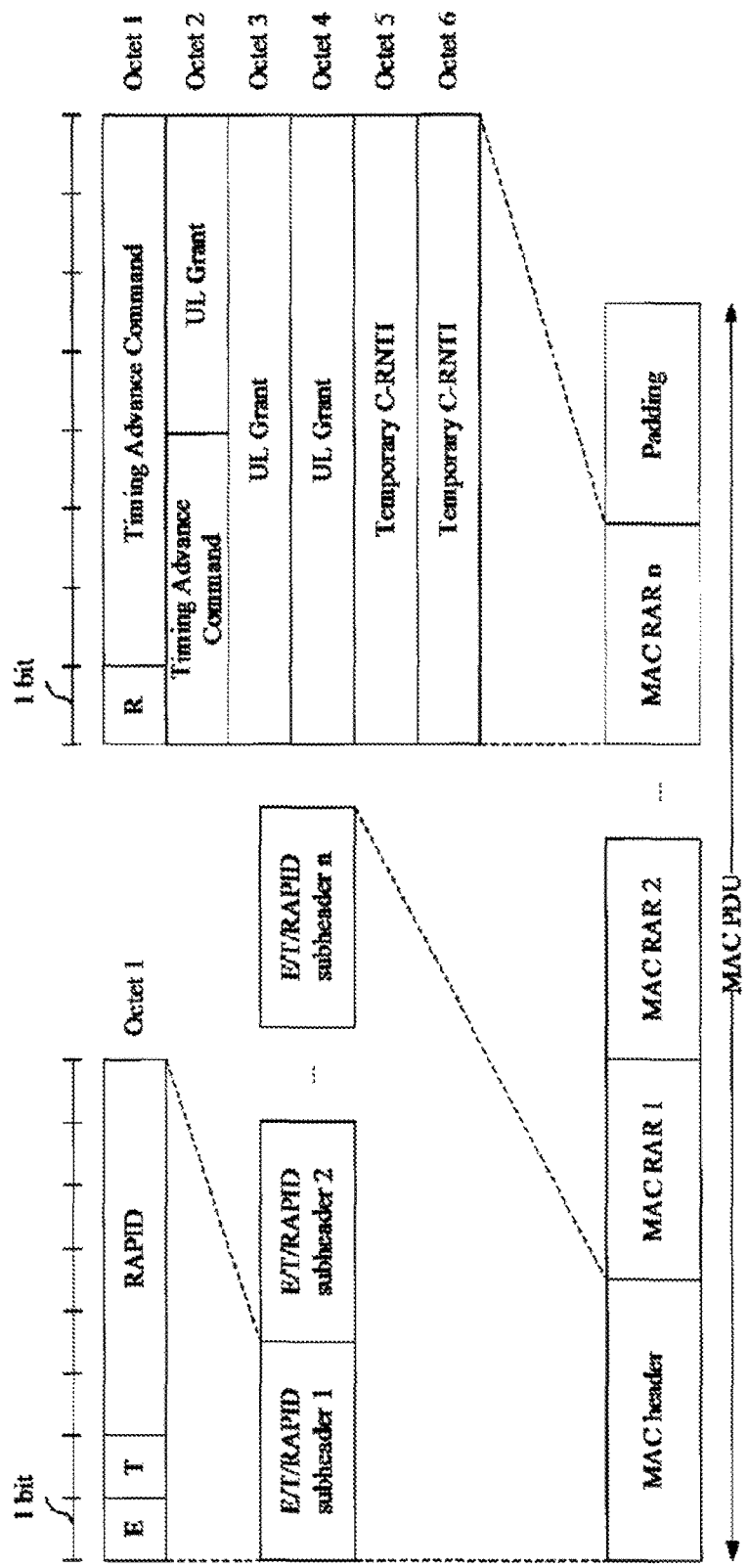
FIG. 14 is a diagram illustrating an example of a random access response according to the present embodiment.

FIG. 14 is a diagram illustrating an example of the random access response according to the present embodiment.

In the downlink, one MAC PDU can include multiple random access responses. In FIG. 14, the random access response (MAC RAR) indicates the random access response. The MAC PDU in FIG. 14 includes one MAC header, n random access responses, and a padding. In FIG. 14, one MAC header includes n E/T/RAPID subheaders (E/T/RAPID fields).

The E/T/RAPID subheader includes an extension field (E field), a type field (T field), and a random access preamble identifier field (RAPID field). The E field is a flag indicating whether or not more fields exist in the MAC header. The E field is set to "1" to indicate that at least another E/T/RAPID field follows. The E field is set to "0" to indicate that the MAC RAR or the padding starts from the next byte.

The T field is a flag to indicate that the MAC subheader includes any of RAPID fields and backoff indicator fields. The T field is set to "1" to indicate presence of the RAPID field in the MAC subheader.

The RAPID field identifies the transmitted random access preamble. The terminal device 1, when the random access preamble having been transmitted by the terminal device 1 corresponds to the RAPID field, considers the random access response reception to be successful, and processes the corresponding MAC RAR.

The MAC RAR includes an R field, a timing advance command field, an uplink grant field, and a temporary C-RNTI field. The R field is a reserved bit set to 0. The timing advance command field indicates an index value TA used to control the amount of timing adjustment for the PUSCH/SRS transmission.

The uplink grant field indicates PUSCH resources used in the uplink. The uplink grant is mapped to the uplink grant field. The temporary C-RNTI field indicates the temporary C-RNTI used by the terminal device 1 during the contention based random access procedure.

Since the random access response (MAC RAR) does not include information indicating the HARQ process number, there is a problem that the HARQ process number corresponding to the uplink grant included in the random access response associated with the non-contention based random access procedure cannot be identified.

Then, the information indicating the HARQ process number, to which the uplink grant included in the random access response corresponds, may be mapped to the temporary C-RNTI field included in the same random access response associated with the non-contention based random access procedure in the serving cell to which asynchronous HARQ is applied. In other words, the temporary C-RNTI field, included in the random access response associated with the non-contention based random access procedure in the serving cell to which the asynchronous HARQ is applied, may be reused to identify the HARQ process number to which the uplink grant included in the same random access response corresponds.

The random access response associated with the non-contention based random access procedure in the serving cell to which the asynchronous HARQ is applied may include a HARQ information field instead of the temporary C-RNTI field. Further, the MAC RAR may include an F field, which is a flag indicating either the temporary C-RNTI field or the HARQ information field being included. The MAC RAR including the F field is referred to as an extended MAC RAR according to the present embodiment.

The HARQ information field included in the MAC RAR is at least mapped to the information indicating the HARQ process number. In other words, the HARQ information field included in the MAC RAR is at least used to indicate the HARQ process number. Further, the HARQ information field included in the MAC RAR may be used to indicate a modulation scheme and a coding scheme. Further, the HARQ information field included in the MAC RAR may be used to indicate a redundancy version.

Figure 15:
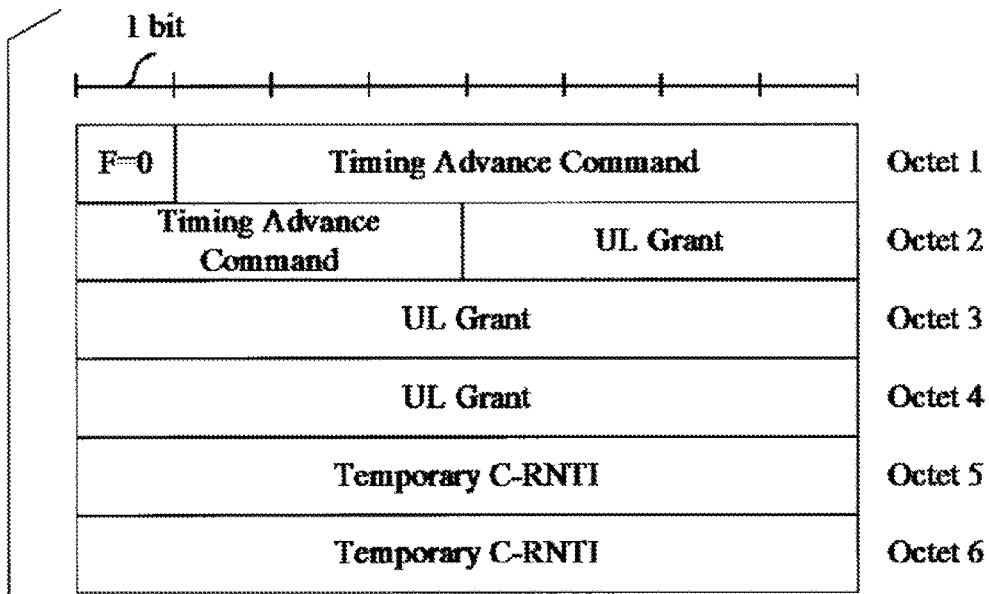
FIG. 15 is a diagram illustrating an example of an extended MAC RAR according to the present embodiment.
Figure 15:
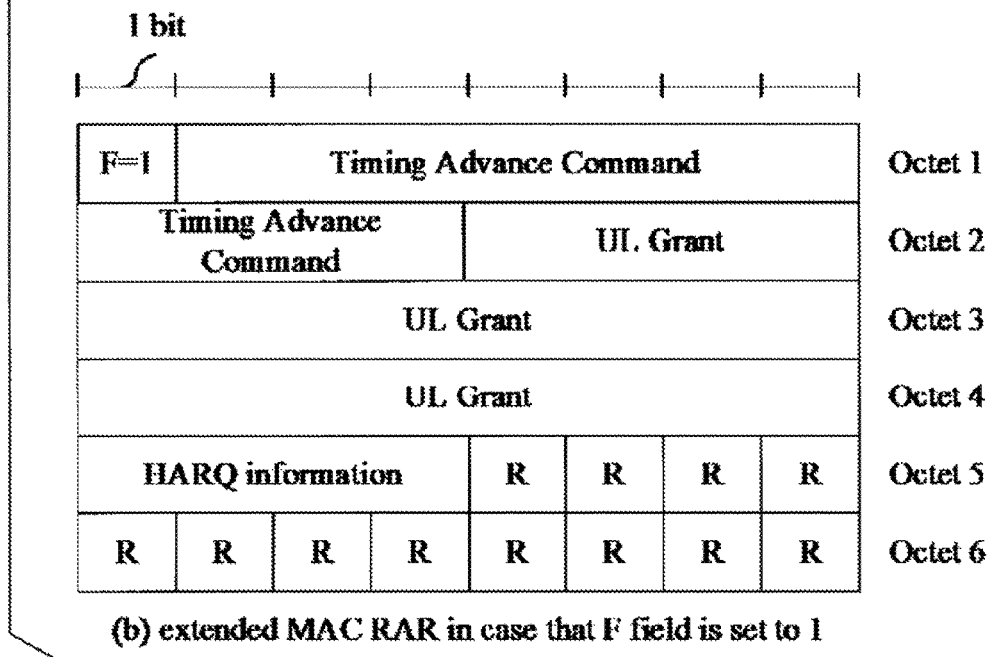

FIG. 15 is a diagram illustrating an example of the extended MAC RAR according to the present embodiment. (a) in FIG. 15 is a diagram illustrating an example of the extended MAC RAR when the F field is set to "0". When the extended MAC RAR includes the temporary C-RNTI field, the F field included in the extended MAC RAR is set to "0", (b) in FIG. 15 is a diagram illustrating an example of the extended MAC RAR when the F field is set to "1". When the extended MAC RAR includes the HARQ information field, the F field included in the extended MAC RAR is set to "1".

With reference to the F field, the terminal device 1 can identify the fields included in the extended MAC RAR. When the F field is set to "0", the known terminal devices can recognize the extended MAC RAR as the known MAC RAR. Consequently, when the known MAC RAR and the extended MAC RAR are multiplexed in one MAC PDU, the known terminal device is not affected.

Further, the HARQ process number to which the uplink grant included in the random access response associated with the non-contention based random access procedure in the serving cell to which the asynchronous HARQ is applied corresponds, may be a specific value. For example, the specific value may be indicated by the information in the RRC layer. For example, the specific value may be based on whether the serving cell supports FDD or TDD. For example, the specific value may be based on the UL-DL configuration. For example, the specific value may be predetermined in the specification or the like.

Further, the terminal device 1 may consider the uplink grant, included in the random access response associated with the non-contention based random access procedure in the serving cell to which asynchronous HARQ is applied, as invalid. In other words, the terminal device 1 may disregard/abandon the uplink grant included in the random access response associated with the non-contention based random access procedure in the serving cell to which the asynchronous HARQ is applied.

The reconfiguration/modification of the HARQ functionality will be described below.

As described above, whether the synchronous HARQ or asynchronous HARQ is applied to the secondary cell is controlled by the RRC layer. The terminal device 1 can perform reconfiguration/modification on the HARQ functionality in a certain secondary cell. For example, the terminal device 1, after configuring the asynchronous HARQ to a certain secondary cell based on the RRC layer information, can reconfigure the synchronous HARQ to the certain secondary cell based on another RRC layer information. For example, the terminal device 1, after configuring the synchronous HARQ to a certain secondary cell based on the RRC layer information, can reconfigure the asynchronous HARQ to the certain secondary cell based on another RRC layer information. For instance, the terminal device 1, after configuring the asynchronous HARQ to a certain secondary cell based on the RRC layer information indicating the asynchronous HARQ enabling, can release the information of the RRC layer and reconfigure the synchronous HARQ to the certain secondary cell. With the above configuration, the HARQ functionality can be flexibly controlled. Here, the information in the RRC layer indicates the synchronous HARQ or the asynchronous HARQ. Further, the information in the RRC layer may be information indicating the asynchronous HARQ enabling.

The terminal device 1 transmits an RRC completion message to the base station device 3 after reconfiguring/modifying the HARQ functionality. The base station device 3 can recognize whether the synchronous HARQ or the asynchronous HARQ is configured as the HARQ functionality in the terminal device 1 based on the received RRC completion message.

However, the maximum number of the HARQ processes simultaneously managed by the HARQ entity corresponding to the secondary cell may differ based on whether the synchronous HARQ or the asynchronous HARQ is applied to the secondary cell. With the above configuration, when information of the RRC layer related to the HARQ functionality corresponding to a certain secondary cell is modified (reconfigured or released), the base station device 3 may not be able to recognize the ongoing HARQ process by the terminal device 1.

Therefore, the terminal device 1, when information of the RRC layer corresponding to a certain serving cell is modified (reconfigured or released), may flash multiple HARQ buffers corresponding to the serving cell, of the multiple HARQ buffers which the terminal device 1 includes, except for the buffer related to the random access message 3.

Further, the terminal device 1, when information of the RRC layer corresponding to a certain serving cell is modified (reconfigured or released), may set the value of the NUI with respect to the HARQ process corresponding to the stated serving cell to 0, except for the NDI related to the random access message 3. Further, the terminal device 1 and the base station device 3, when the information of the RRC layer corresponding to a certain serving cell is modified (reconfigured or released), may consider the next transmission related to the HARQ process corresponding to the stated serving cell as initial transmission, except for the transmission related to the random access message 3. Moreover, the terminal device 1 and the base station device 3, when the information of the RRC layer corresponding to a certain serving cell is modified (reconfigured or released), may initialize the HARQ entity corresponding to the stated serving cell.

Then, the terminal device 1, when the information of the RRC layer corresponding to a certain secondary cell is modified (reconfigured or released), may flash multiple HARQ buffers corresponding to the stated secondary cell, of the multiple HARQ buffers which the terminal device 1 includes. Further, the terminal device 1, when the information of the RRC layer corresponding to a certain secondary cell is modified (reconfigured or released), may set the value of the NDI with respect to the HARQ process corresponding to the stated secondary cell to 0. Further, the terminal device 1 and the base station device 3, when the information of the RRC layer corresponding to a certain secondary cell is modified (reconfigured or released), may consider the next transmission related to the HARQ process corresponding to the stated secondary cell as initial transmission. Moreover, the terminal device 1 and the base station device 3, when the information of the RRC layer corresponding to a secondary serving cell is modified (reconfigured or released), may initialize the HARQ entity corresponding to the stated secondary cell.

With the above configuration, when the base station device 3 transmits the information of the RRC layer which indicates reconfiguration/modification of the HARQ functionality to the terminal device 1, the base station device 3 can properly control the HARQ process after reconfiguring/modifying the HARQ functionality.

Configurations of devices according to the present embodiment will be described below.

Figure 16:
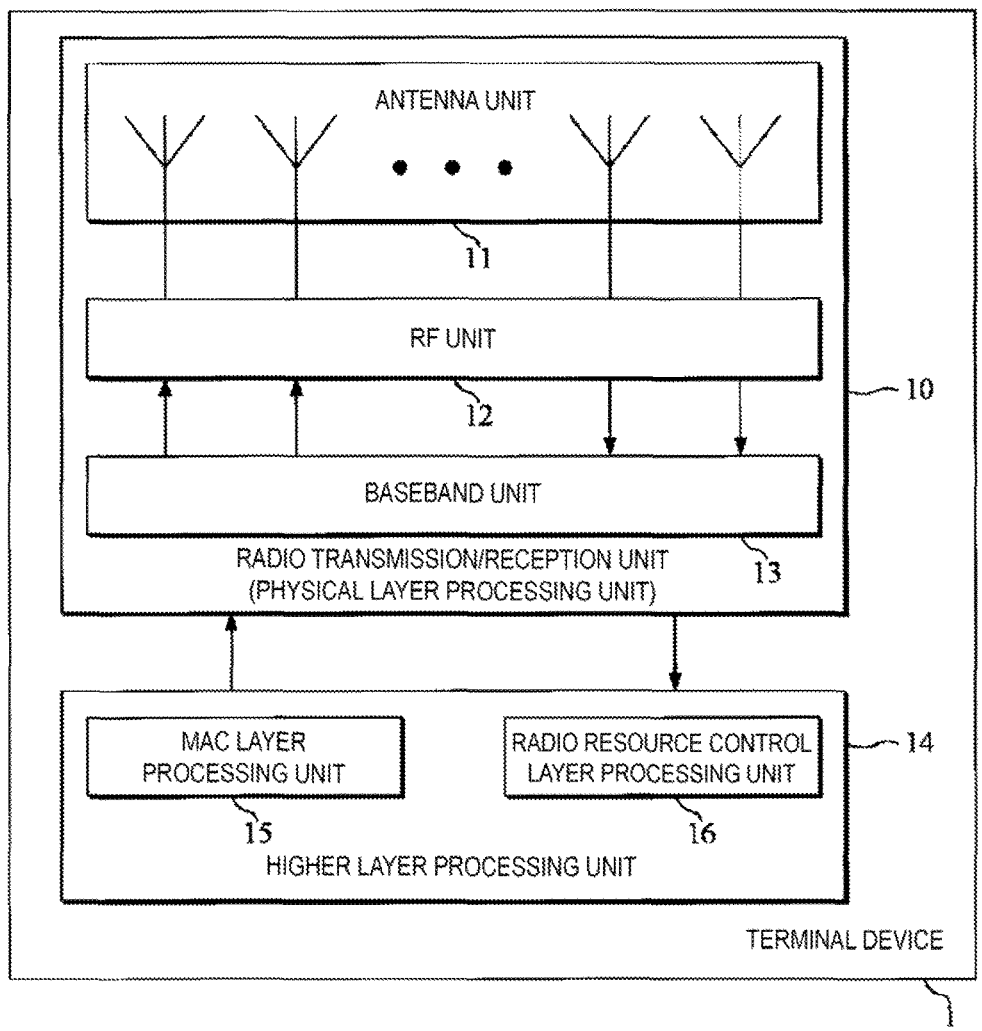
FIG. 16 is a schematic block diagram illustrating a configuration of a terminal device 1 according to the present embodiment.

FIG. 16 is a schematic block diagram illustrating a configuration of the terminal device 1 according to the present embodiment. As illustrated, the terminal device 1 is configured to include a radio transmission/reception unit 10 and a higher layer processing unit 14. The radio transmission/reception unit 10 is configured to include an antenna unit 11, a radio frequency (RF) unit 12, and a baseband unit 13. The higher layer processing unit 14 is configured to include a MAC layer processing unit 15 and a radio resource control layer processing unit 16. The radio transmission/reception unit 10 is also referred to as a transmission unit, a reception unit, or a physical layer processing unit.

The higher layer processing unit 14 outputs uplink data (transport block) generated by a user operation or the like, to the radio transmission/reception unit 10. The higher layer processing unit 14 performs processing of the medium access control (MAC) layer, the packet data convergence protocol (PDCP) layer, the radio link control (RLC) layer, and the radio resource control (RRC) layer.

The MAC layer processing unit 15 in the higher layer processing unit 14 processes the MAC layer. The MAC layer processing unit 15 controls a HARQ based on various configuration information/parameters managed by the radio resource control layer processing unit 16. The MAC layer processing unit 15 manages multiple HARQ entities, multiple HARQ processes, and multiple HARQ buffers.

The radio resource control layer processing unit 16 in the higher layer processing unit 14 processes the radio resource control layer. The radio resource control layer processing unit 16 manages the various configuration information/parameters thereof. The radio resource control layer processing unit 16 sets the various configuration information/parameters based on the RRC layer signal received from the base station device 3. In other words, the radio resource control layer processing unit 16 sets the various configuration information/parameters based on the information indicating the various configuration information/parameters received from the base station device 3.

The radio transmission/reception unit 10 performs processing of the physical layer, such as modulation, demodulation, coding, and decoding. The radio transmission/reception unit 10 demultiplexes, demodulates, and decodes a signal received from the base station device 3, and outputs the information resulting from the decoding to the higher layer processing unit 14. The radio transmission/reception unit 10 modulates and codes data to generate a transmit signal, and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a cyclic prefix (CP) from the digital signal resulting from the conversion, performs fast Fourier transform (FFT) on the signal from which the CP has been removed, and extracts a signal in the frequency domain.

The baseband unit 13 performs inverse fast Fourier transform (IFFT) on data to generate an SC-FDMA symbol, attaches a CP to the generated SC-FDMA symbol, generates a digital signal in a baseband, and converts the digital signal in the baseband into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. The RF unit 12 amplifies the power. Further, the RF unit 12 may include functionality for controlling the transmission power. The RF unit 12 is also referred to as a transmission power control unit.

Figure 17:
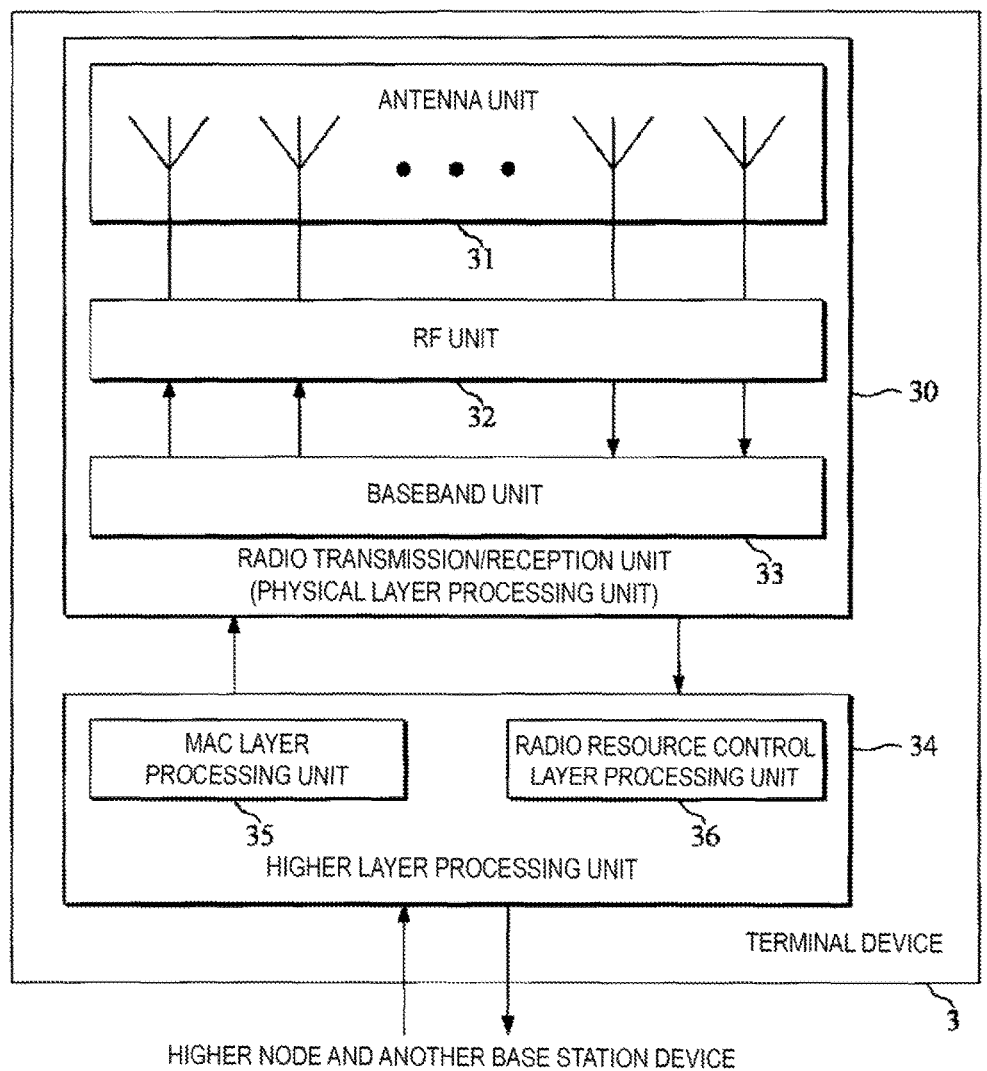
FIG. 17 is a schematic block diagram illustrating a configuration of a base station device 3 according to the present embodiment.

FIG. 17 is a schematic block diagram illustrating a configuration of the base station device 3 according to the present embodiment. As illustrated, the base station device 3 is configured to include a radio transmission/reception unit 30 and a higher layer processing unit 34. The radio transmission/reception unit 30 is configured to include an antenna unit 31, an RF unit 32, and a baseband unit 33. The higher layer processing unit 34 is configured to include a MAC layer processing unit 35 and a radio resource control layer processing unit 36. The radio transmission/reception unit 30 is also referred to as a transmission unit, a reception unit, or a physical layer processing unit.

The higher layer processing unit 34 performs processing of the medium access control (MAC) layer, the packet data convergence protocol (PDCP) layer, the radio link control (RLC) layer, and the radio resource control (RRC) layer.

The MAC layer processing unit 35 in the higher layer processing unit 34 processes the MAC layer. The MAC layer processing unit 15 controls a HARQ based on various configuration information/parameters managed by the radio resource control layer processing unit 16. The MAC layer processing unit 15 generates ACK/NACK and HARQ information corresponding to the uplink data (UL-SCH). The ACK/NACK and HARQ information corresponding to the uplink data (UL-SCH) are transmitted on the PHICH or PDCCH to the terminal device 1.

The radio resource control layer processing unit 36 in the higher layer processing unit 34 processes the radio resource control layer. The radio resource control layer processing unit 36 generates or acquires from a higher node, such as downlink data (transport block) arranged on a physical downlink shared channel, system information, an RRC message, a MAC control element (CE), and outputs the generated or acquired data to the radio transmission/reception unit 30. Furthermore, the radio resource control layer processing unit 36 manages various configuration information/parameters for each of the terminal devices 1. The radio resource control layer processing unit 36 may set the various configuration information/parameters for each of the terminal devices 1 via a higher layer signal. In other words, the radio resource control layer processing unit 36 transmits/broadcasts information indicating the various configuration information/parameters.

The capability of the radio transmission/reception unit 30 is similar to that of the radio transmission/reception unit 10, and hence description thereof is omitted.

Hereinafter, various aspects of the terminal device and the base station device will be described according to the present embodiment.

(1) The terminal device according to the present embodiment is a terminal device configured to communicate, in multiple serving cells including one primary cell and one secondary cell, with the base station device. The terminal device includes: a reception unit to receive information from an RRC layer indicating asynchronous HARQ; a MAC layer processing unit to manage a first HARQ process corresponding to the primary cell and a second HARQ process corresponding to the secondary cell; and a transmission unit to transmit MAC layer data in response to the indication from the first HARQ process and the second HARQ process. The MAC layer processing unit, regardless of whether or not the RRC layer information indicating the asynchronous HARQ is configured, instructs the first uplink HARQ process to always execute synchronous HARQ; and, based on whether or not the RRC layer information indicating the asynchronous HARQ is configured, instructs the second uplink HARQ process to execute the synchronous HARQ or the asynchronous HARQ.

(2) The base station device according to the present embodiment is a base station device configured to communicate, in multiple serving cells including one primary cell and one secondary cell, with the terminal device. The base station device includes a transmission unit to transmit the RRC layer information indicating asynchronous HARQ, a MAC layer processing unit to manage a first HARQ process corresponding to the primary cell and a second HARQ process corresponding to the secondary cell, and a reception unit to receive the MAC layer data in response to the indication from the first HARQ process and the second HARQ process. The MAC layer processing unit, regardless of whether or not the RRC layer information indicating the asynchronous HARQ is configured in the terminal device, instructs the first uplink HARQ process to always execute synchronous HARQ; and, based on whether or not the RRC layer information indicating the asynchronous HARQ is configured in the terminal device, instructs the second uplink HARQ process to execute the synchronous HARQ or the asynchronous HARQ, (3) In the present embodiment, the primary cell is the cell in which the terminal device executes the initial connection establishment procedure, the cell in which the terminal device starts the connection re-establishment procedure, or the cell which is indicated as the primary cell in the handover procedure.

(4) The terminal device according to the present embodiment includes a reception unit to receive the RRC layer information indicating the asynchronous HARQ and the uplink grant, and a transmission unit to transmit the MAC layer data in response to the uplink grant in the secondary cell. Regardless of whether or not the RRC layer information indicating the asynchronous HARQ is configured, the synchronous HARQ is always applied to the MAC layer data corresponding to the uplink grant received on the physical downlink control channel including a CRC parity bit scrambled by the temporary C-RNTI. Whether the synchronous HARQ or the asynchronous HARQ is applied to the MAC layer data corresponding to the uplink grant received on the physical downlink control channel including a CRC parity bit scrambled by the C-RNTI is determined based on whether or not the RRC layer information indicating the asynchronous HARQ is configured.

(5) The base station device according to the present embodiment includes a transmission unit to transmit the RRC layer information indicating asynchronous HARQ and the uplink grant, and a reception unit to receive the MAC layer data in response to the uplink grant in the secondary cell. Regardless of whether or not the RRC layer information indicating the asynchronous HARQ is configured in the terminal device, the synchronous HARQ is always applied to the MAC layer data corresponding to the uplink grant transmitted on the physical downlink control channel including a CRC parity bit scrambled by the temporary C-RNTI. Whether the synchronous HARQ or the asynchronous HARQ is applied to the MAC layer data corresponding to the uplink grant transmitted on the physical downlink control channel including a CRC parity bit scrambled by the C-RNTI in the terminal device is determined based on whether or not the RRC layer information indicating the asynchronous HARQ is configured in the terminal device.

(6) In the terminal device according to the present embodiment, regardless of whether or not the RRC layer information indicating the asynchronous HARQ is configured, the synchronous HARQ is always applied to the MAC layer data corresponding to the uplink grant included in the random access response related to the contention based random access procedure.

(7) In the present embodiment, whether the synchronous HARQ or the asynchronous HARQ is applied to the MAC layer data corresponding to the uplink grant included in the random access response related to the non-contention based random access procedure is determined based on whether or not the RRC layer information indicating the asynchronous HARQ is configured in the terminal device.

(8) In the terminal device according to the present embodiment, regardless of whether or not the RRC layer information indicating the asynchronous HARQ is configured in the terminal device, the synchronous HARQ is always applied to the MAC layer data corresponding to the uplink grant having been received on a physical downlink control channel including a CRC parity bit scrambled by the SPS C-RNTI.

(9) The terminal device according to the present embodiment includes a reception unit to receive the RRC layer information indicating the asynchronous HARQ, and a transmission unit to transmit the MAC layer data in response to the uplink grant received on the physical downlink control channel including a CRC parity bit scrambled by the C-RNTI. Regardless of whether or not the RRC layer information indicating the asynchronous HARQ is configured, the synchronous HARQ is always applied to the MAC layer data transmission corresponding to the uplink grant having been received on the physical downlink control channel in a first search space. Whether the synchronous HARQ or the asynchronous HARQ is applied to the MAC layer data transmission corresponding to the uplink grant having been received on the physical downlink control channel in a second search space is determined based on whether or not the RRC layer information indicating the asynchronous HARQ is configured.

(10) The base station device according to the present embodiment includes a transmission unit to transmit the RRC layer information indicating asynchronous HARQ, and a reception unit to receive the MAC layer data in response to the uplink grant transmitted on the physical downlink control channel including a CRC parity bit scrambled by the C-RNTI. Regardless of whether or not the RRC layer information indicating the asynchronous HARQ is configured in the terminal device, the synchronous HARQ is always applied to the MAC layer data transmission corresponding to the uplink grant transmitted on the physical downlink control channel in a first search space. Whether the synchronous HARQ or the asynchronous HARQ is applied to the MAC layer data reception corresponding to the uplink grant transmitted on the physical downlink control channel in a second search space, is determined based on whether or not the RRC layer information indicating the asynchronous HARQ is configured in the terminal device.

(11) In the present embodiment, the first search space is a common search space (CSS), and the second search space is a UE-specific search space (USS) given by the C-RNTI.

(12) The terminal device according to the present embodiment includes a reception unit to receive the RRC layer information indicating the asynchronous HARQ for a secondary cell, and a first random access response which is a random access response including a field for indicating the uplink grant and temporary C-RNTI and is related to the non-contention based random access procedure in the secondary cell; a transmission unit to transmit the MAC layer data; and a MAC layer processing unit configured to manage multiple HARQ processes and deliver the uplink grant to the HARQ process which instructs the transmission unit to transmit the MAC layer data in response to the uplink grant. When the RRC layer information indicating the asynchronous HARQ is configured, the HARQ process to which the uplink grant included in the first random access response is delivered is determined by the value of the field for indicating the temporary C-RNTI included in the first random access response.

(13) In the terminal device according to the present embodiment, when the RRC layer information indicating the asynchronous HARQ is not configured, the HARQ process to which the uplink grant included in the first random access response is delivered is determined by the subframe having received the first random access response.

(14) In the terminal device according to the present embodiment, the reception unit receives a second random access response related to the contention based random access procedure in the secondary cell; regardless of whether or not the RRC layer information indicating the asynchronous HARQ is configured, the HARQ process to which the uplink grant included in the second random access response is delivered is determined by the subframe having received the second random access response.

(15) The base station device according to the present embodiment includes: a transmission unit to transmit the RRC layer information indicating the asynchronous HARQ for a secondary cell, and a first random access response which is a random access response including a field for indicating the uplink grant and temporary C-RNTI and is related to the non-contention based random access procedure in the secondary cell; a reception unit to receive the MAC layer data; and a MAC layer processing unit to manage multiple HARQ processes. When the RRC layer information indicating the asynchronous HARQ is configured in the terminal device, the value of the field for indicating the temporary C-RNTI included in the first random access response indicates the HARQ process corresponding to uplink grant included in the first random access response.

(16) In the base station device according to the present embodiment, when the RRC layer information indicating the asynchronous HARQ is not configured in the terminal device, the HARQ process corresponding to the uplink grant included in the first random access response is associated with the subframe having transmitted the first random access response.

(17) In the base station device according to the present embodiment, the transmission unit transmits a second random access response related to the contention based random access procedure in the secondary cell; regardless of whether or not the RRC layer information indicating the asynchronous HARQ is configured, the HARQ process corresponding to the uplink grant included in the second random access response is associated with the subframe having transmitted the second random access response.

(18) The terminal device according to the present embodiment includes a reception unit to receive the RRC layer information indicating the asynchronous HARQ, a transmission unit to transmit the MAC layer data, and a MAC layer processing unit to deliver the uplink grant to the HARQ process instructing the transmission unit to transmit the MAC layer data in response to the uplink grant. Regardless of whether or not the RRC layer information indicating the asynchronous HARQ is configured, the HARQ process to which the uplink grant having been received on the physical downlink control channel including a CRC parity bit scrambled by the temporary C-RNTI is delivered is determined by the subframe having received the uplink grant on the physical downlink control channel including a CRC parity bit scrambled by the temporary C-RNTI. The HARQ process to which the uplink grant received on the physical downlink control channel including a CRC parity bit scrambled by the C-RNTI is delivered, is determined by either the HARQ information having been received on the physical downlink control channel including a CRC parity bit scrambled by the C-RNTI or the subframe having received the uplink grant on the physical downlink control channel including a CRC parity bit scrambled by the C-RNTI based on whether or not the RRC layer information indicating the asynchronous HARQ is configured.

(19) In the terminal device according to the present embodiment, regardless of whether or not the RRC layer information indicating the asynchronous HARQ is configured, the HARQ process to which the uplink grant included in the random access response related to the contention based random access procedure is delivered, is determined by a subframe number of the subframe having received the random access response.

(20) In the terminal device according to the present embodiment, the HARQ process to which the uplink grant included in the random access response related to the non-contention based random access procedure is delivered is determined, based on whether or not the RRC layer information indicating the asynchronous HARQ is configured, by either the information included in the random access response or the subframe having received the uplink grant on the physical downlink control channel including a CRC parity bit scrambled by the C-RNTI.

(21) In the terminal device according to the present embodiment, regardless of whether or not the RRC layer information indicating the asynchronous HARQ is configured, the HARQ process to which the uplink grant having been received on the physical downlink control channel including a CRC parity bit scrambled by the SPS C-RNTI is delivered is determined by the subframe having received the uplink grant on the physical downlink control channel including a CRC parity bit scrambled by the SPS C-RNTI.

(22) The base station device according to the present embodiment includes a transmission unit to transmit the RRC layer information indicating the asynchronous HARQ and the uplink grant, a reception unit to receive the MAC layer data, and a MAC layer processing unit to deliver the uplink grant to the HARQ process instructing the transmission unit to transmit the MAC layer data in response to the uplink grant. Regardless of whether or not the RRC layer information indicating the asynchronous HARQ is configured in the terminal device, the HARQ process corresponding to the uplink grant transmitted on the physical downlink control channel including a CRC parity bit scrambled by the temporary C-RNTI is associated with the subframe transmitting the uplink grant on the physical downlink control channel including a CRC parity bit scrambled by the temporary C-RNTI; and whether the HARQ process to which the uplink grant transmitted on the physical downlink control channel including a CRC parity bit scrambled by the C-RNTI is delivered is indicated by the HARQ information transmitted on the physical downlink control channel including a CRC parity bit scrambled by the C-RNTI or is associated with the subframe having transmitted the uplink grant on the physical downlink control channel including a CRC parity bit scrambled by the C-RNTI, is determined based on whether or not the RRC layer information indicating the asynchronous HARQ is configured in the terminal device.

(23) In the base station device according to the present embodiment, regardless of whether or not the RRC layer information indicating the asynchronous HARQ is configured in the terminal device, the HARQ process corresponding to the uplink grant included in the random access response related to the contention based random access procedure, is associated with the subframe having transmitted the random access response.

(24) in the base station device according to the present embodiment, whether the HARQ process corresponding to the uplink grant included in the random access response related to the non-contention based random access procedure is indicated by the information included in the random access response or is associated with the subframe having transmitted the uplink grant on the physical downlink control channel including a CRC parity bit scrambled by the C-RNTI, is determined based on whether or not the RRC layer information indicating the asynchronous HARQ is configured.

(25) In the base station device according to the present embodiment, regardless of whether or not the RRC layer information indicating the asynchronous HARQ is configured in the terminal device, the HARQ process corresponding to the uplink grant having been transmitted on the physical downlink control channel including a CRC parity bit scrambled by the SPS C-RNTI is associated with the subframe having transmitted the uplink grant on the physical downlink control channel including a CRC parity bit scrambled by the SPS C-RNTI.

(26) The terminal device according to the present embodiment includes a reception unit to receive the uplink grant on the physical downlink control channel including a CRC parity bit scrambled by the C-RNTI, a transmission unit to transmit the MAC layer data, and a MAC layer processing unit delivering the uplink grant to the HARQ process which instructs the transmission unit to transmit the MAC layer data in response to the uplink grant. Regardless of whether or not the RRC layer information indicating the asynchronous HARQ is configured, the HARQ process to which the uplink grant received on the physical downlink control channel in a first search space is delivered is determined by the subframe having received the uplink grant on the physical downlink control channel in the first search space; and the HARQ process to which the uplink grant received on the physical downlink control channel in a second search space is delivered is determined, based on whether or not the RRC layer information indicating the asynchronous HARQ is configured, by either the HARQ information received on the physical downlink control channel in the second search space or the subframe having received the uplink grant on the physical downlink control channel in the second search space.

(27) The base station device according to the present embodiment includes a transmission unit to transmit the uplink grant on the physical downlink control channel including a CRC parity bit scramble by the C-RNTI, a reception unit to receive the MAC layer data, and a MAC layer processing unit to manage multiple HARQ processes. Regardless of whether or not the RRC layer information indicating the asynchronous HARQ is configured in the terminal device, the HARQ process corresponding to the uplink grant transmitted on the physical downlink control channel in a first search space is associated with the subframe having transmitted the uplink grant on the physical downlink control channel in the first search space; and whether the HARQ process corresponding to the uplink grant transmitted on the physical downlink control channel in a second search space is indicated by the HARQ information transmitted on the physical downlink control channel in the second search space or is associated with the subframe having transmitted the uplink grant on the physical downlink control channel in the second search space, is determined based on whether or not the RRC layer information indicating the asynchronous HARQ is configured in the terminal device.

(28) The terminal device according to the present embodiment includes a reception unit to receive an RRC layer parameter indicating the synchronous HARQ or asynchronous HARQ to a secondary cell, a MAC layer processing unit to apply the synchronous HARQ or asynchronous HARQ to MAC layer data transmission in the secondary cell based on the RRC layer parameter, and multiple HARQ buffers to store the MAC layer data. The HARQ control unit, when the RRC layer parameter is modified/reconfigured/released, flashes a HARQ buffer corresponding to the secondary cell, of the multiple HARQ buffers.

(29) The terminal device according to the present embodiment includes a reception unit to receive an RRC layer parameter indicating the synchronous HARQ or the asynchronous HARQ to a secondary cell, a MAC layer processing unit to apply the synchronous HARQ or asynchronous HARQ to MAC layer data transmission in the secondary cell based on the RRC layer parameter. The MAC layer processing unit manages a HARQ process related to the MAC layer data transmitted in the secondary cell and sets the NDI corresponding to the HARQ process to 0 when the RRC layer parameter is modified/reconfigured.

(30) The terminal device according to the present embodiment includes a reception unit to receive the RRC layer parameter indicating the synchronous HARQ or the asynchronous HARQ to a secondary cell, and a MAC layer processing unit to apply the synchronous HARQ or asynchronous HARQ to MAC layer data transmission in the secondary cell based on the RRC layer parameter. The MAC layer processing unit manages the HARQ processes related to the MAC layer data transmitted in the secondary cell, and considers, when the RRC layer parameter is modified/reconfigured, the next transmission related to the HARQ process as initial transmission.

(31) The terminal device according to the present embodiment includes a reception unit to receive the RRC layer parameter indicating the synchronous HARQ or the asynchronous HARQ to a secondary cell, and a MAC layer processing unit to apply the synchronous HARQ or asynchronous HARQ to MAC layer data transmission in the secondary cell based on the RRC layer parameter. The MAC layer processing unit includes a HARQ entity which manages multiple HARQ processes related to the MAC layer data in the secondary cell, and, when the RRC layer parameter is modified/reconfigured, initializes the HARQ entity.

With the above configurations, the terminal device 1 can communicate with the base station device 3 efficiency.

A program running on each of the base station device 3 and the terminal device 1 according to the present invention may be a program that controls a central processing unit (CPU) and the like (a program for causing a computer to operate) in such a manner as to realize the functions according to the above-described embodiment of the present invention. The information handled in these devices is temporarily stored in a random access memory (RAM) while being processed. Thereafter, the information is stored in various types of read only memory (ROM) such as a flash ROM and a hard disk drive (HDD) and when necessary, is read out by the CPU to be modified or rewritten.

Moreover, the terminal device 1 and the base station device 3 according to the above-described embodiment may be partially realized by a computer. This configuration may be realized by recording a program for realizing such control functions on a computer-readable recording medium and causing a computer system to read the program recorded on the recording medium for execution.

The "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiment can be realized as an aggregation (a device group) constituted of multiple devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiment can communicate with the base station device as the aggregation.

Furthermore, the base station device 3 according to the above-described embodiment may be an evolved universal terrestrial radio access network (EUTRAN). Furthermore, the base station device 3 according to the above-described embodiment may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the terminal device is described as one example of a communication device, but the present invention is not limited thereto, and can be applied to a terminal device or a communication device of a fixed-type or a stationary-type electronic apparatus installed indoors or outdoors, for example, such as an audio-video (AV) apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the above embodiment, and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

DESCRIPTION OF REFERENCE NUMERALS 1 (1A, 1B, 1C) Terminal device
3 Base station device
10 Radio transmission/reception unit
11 Antenna unit
12 RF unit
13 Baseband unit
14 Higher layer processing unit
15 MAC layer processing unit
16 Radio resource control layer processing unit
30 Radio transmission/reception unit
31 Antenna unit
32 RF unit
33 Baseband unit
34 Higher layer processing unit
35 MAC layer processing unit
36 Radio resource control layer processing unit

The invention claimed is:

1. A terminal device comprising:
reception circuitry configured and/or programmed to receive a control channel including a downlink control information (DCI) format; and
transmission circuitry configured and/or programmed to transmit a physical uplink shared channel (PUSCH);
wherein, the DCI format including an uplink index and information for indicating a hybrid automatic repeat request (HARQ) process number,
in a case that both a first bit and a second bit of the uplink index are set to 1, the HARQ process number of the PUSCH corresponding to the first bit being X and the HARQ process number of the PUSCH corresponding to the second bit being mod (X+1, Z),
the mod (X+1, Z) being a function outputting a remainder when dividing (X+1) by Z,
the X being determined based on the information for indicating the HARQ process number, and
the Z being a value identical to a maximum number of HARQ processes in a serving cell determined by an uplink/downlink configuration.

2. The terminal device according to claim 1, wherein, in a case that the first bit is set to 0 and the second bit is set to 1, the HARQ process number of the PUSCH corresponding to the second bit is the X.

3. The terminal device according to claim 1, wherein the reception circuitry is further configured and/or programmed to receive information indicating the UL/DL configuration.

4. The terminal device according to claim 1, wherein the UL/DL configuration is 0.

5. A base station device comprising:
transmission circuitry configured and/or programmed to transmit a control channel including a downlink control information (DCI) format; and
reception circuitry configured and/or programmed to receive a physical uplink shared channel (PUSCH);
wherein, the DCI format including an uplink index and information for indicating a hybrid automatic repeat request (HARQ) process number,
in a case that both a first bit and a second bit of the uplink index are set to 1, the HARQ process number of the PUSCH corresponding to the first bit being X and the HARQ process number of the PUSCH corresponding to the second bit being mod (X+1, Z), the mod (X+1, Z) being a function outputting a remainder when dividing (X+1) by Z, the X being determined based on the information for indicating the HARQ process number, and the Z being a value identical to a maximum number of HARQ processes in a serving cell determined by an uplink/downlink configuration.

6. The base station device according to claim 5, wherein, in a case that the first bit is set to 0 and the second bit is set to 1, the HARQ process number of the PUSCH corresponding to the second bit is the X.

7. The base station device according to claim 5, wherein the transmission circuitry is further configured and/or programmed to transmit information indicating the UL/DL configuration.

8. The base station device according to claim 5, wherein the UL/DL configuration is 0.

9. A communication method for a terminal device, the communication method comprising:

receiving a control channel including a downlink control information (DCI) format; and transmitting a physical uplink shared channel (PUSCH);

wherein, the DCI format including an uplink index and information for indicating a hybrid automatic repeat request (HARQ) process number, in a case that both a first bit and a second bit of the uplink index are set to 1, the HARQ process number of the PUSCH corresponding to the first bit being X and the HARQ process number of the PUSCH corresponding to the second bit being mod (X+1, Z), the mod (X+1, Z) being a function outputting a remainder when dividing (X+1) by Z, the X being determined based on the information for indicating the HARQ process number, and the Z being a value identical to a maximum number of HARQ processes in a serving cell determined by an uplink/downlink configuration.

10. A communication method for a base station device, the communication method comprising:

transmitting a control channel including a downlink control information (DCI) format; and receiving a physical uplink shared channel (PUSCH);

wherein, the DCI format including an uplink index and information for indicating a hybrid automatic repeat request (HARQ) process number, in a case that both a first bit and a second bit of the uplink index are set to 1, the HARQ process number of the PUSCH corresponding to the first bit being X and the HARQ process number of the PUSCH corresponding to the second bit being mod (X+1, Z), the mod (X+1, Z) being a function outputting a remainder when dividing (X+1) by Z, the X being determined based on the information for indicating the HARQ process number, and the Z being a value identical to a maximum number of HARQ processes in a serving cell determined by an uplink/downlink configuration.

\* \* \* \* \*